(12) United States Patent
Nichols et al.

(10) Patent No.: US 12,363,251 B2
(45) Date of Patent: Jul. 15, 2025

(54) SYSTEMS AND METHODS FOR INSPECTION ANIMATION

(71) Applicant: SeeScan, Inc., San Diego, CA (US)

(72) Inventors: Michael P. Nichols, Temecula, CA (US); Alexander L Warren, Escondido, CA (US); Michael J. Martin, San Diego, CA (US)

(73) Assignee: SeeScan, Inc., San Diego, CA (US)

(\*) Notice: Subject to any disclaimer, the term of this patent is extended or adjusted under 35 U.S.C. 154(b) by 187 days.

(21) Appl. No.: 18/365,225

(22) Filed: Aug. 4, 2023

(65) Prior Publication Data
US 2024/0048666 A1     Feb. 8, 2024

Related U.S. Application Data

(60) Provisional application No. 63/485,905, filed on Feb. 18, 2023, provisional application No. 63/370,760, filed on Aug. 8, 2022.

(51) Int. Cl.
*H04N 5/262* (2006.01)
*G06T 13/20* (2011.01)

(52) U.S. Cl.
CPC ........... *H04N 5/2628* (2013.01); *G06T 13/20* (2013.01)

(58) Field of Classification Search
CPC ...... H04N 5/2628; H04N 5/272; G06T 13/20; G03B 37/04; G03B 37/005; G01N 21/954
See application file for complete search history.

(56) References Cited

U.S. PATENT DOCUMENTS

| | | | | |
|---|---|---|---|---|
| 8,547,428 B1* | 10/2013 | Olsson | ............... | G01N 21/8803 348/374 |
| 10,001,425 B1* | 6/2018 | Olsson | ................. | G03B 17/561 |
| 11,132,781 B1 | 9/2021 | Olsson et al. | | |
| 11,946,882 B2* | 4/2024 | Morris | .................... | G01N 23/04 |
| 2005/0275725 A1 | 12/2005 | Olsson et al. | | |
| 2013/0083187 A1* | 4/2013 | Xie | ......................... | G06Q 50/06 348/82 |

(Continued)

OTHER PUBLICATIONS

International Searching Authority, "Written Opinion of the International Searching Authority" for PCT Patent Application No. PCT/US2023/071634, Nov. 8, 2023, European Patent Office, Munich.

*Primary Examiner* — Fernando Alcon
(74) *Attorney, Agent, or Firm* — Steven C. Tietsworth, Esq.; Michael J. Pennington, Esq.

(57) ABSTRACT

The application discloses various systems and methods for generating and utilizing computer animation transition methods and systems in the leveling of a video to an upright, earth normal orientation which may be used in pipe inspections. Such computer animation transitions may be generated from a single inspection image at one time in the inspection video or from subsequent inspection images at different times and points in space in the inspection video. Some leveling methods may include rotating a square GL surface in ninety degree increments that includes one or more computer animation transition. Other leveling methods may also include rotating a three dimensional GL surface that is shaped to match the shape of the pipe that includes one or more. Further methods may include rotating a GL surface that is a regular polygon in shape that includes one or more computer animation transition.

20 Claims, 24 Drawing Sheets

(56) References Cited

U.S. PATENT DOCUMENTS

| | | | |
|---|---|---|---|
| 2014/0210989 A1* | 7/2014 | Olsson | H04N 7/183 |
| | | | 348/84 |
| 2017/0064208 A1 | 3/2017 | Salimpour et al. | |
| 2017/0176344 A9 | 6/2017 | Olsson et al. | |
| 2018/0202944 A1* | 7/2018 | Sanchez | G01N 21/954 |
| 2019/0331612 A1* | 10/2019 | Morris | G01N 21/954 |
| 2019/0331613 A1* | 10/2019 | Morris | G01N 21/954 |
| 2019/0371071 A1* | 12/2019 | Lyons | G06T 7/246 |
| 2022/0051395 A1* | 2/2022 | Vandam | G06T 7/0006 |
| 2024/0039991 A1* | 2/2024 | McCrackin | G01N 21/954 |
| 2024/0044437 A1* | 2/2024 | Sheltami | G01N 29/14 |

* cited by examiner

630 ↘

Identify and render in the graphics library (GL) surface an inspection image from the inspection video signal that corresponds with an orientation signal describing the orientation of the inspection image relative to an upright, earth normal orientation that fits predetermined criteria to generate a rotation correction.
635

↓

Determine the appropriate rotation to achieve an upright, earth normal orientation.
640

↓

Divide the rotation interval into a number of sequential rotation steps.
645

↓

Rotate the GL surface containing the selected inspection image from step 635 to each sequential rotation step until reaching the final corrected rotation (optionally based on the refresh rate of the electronic display device or the frame rate of the inspection camera). Optionally, the inspection video may be truncated, reduced in size, stretched, or otherwise resized to fit the shape of the GL surface at each sequential rotation step.
650

↓

Output the computer animation transition to one or more non-transitory memories and/or one or more electronic display devices for displaying the computer animation transition in real-time, near real-time, or in playback.
655

| 1210 | 1220 |
|---|---|
| Generate, via one or more image sensors disposed in an inspection camera, a video signal comprising a plurality of sequential inspection images. | Generate, via one or more orientation sensors disposed in the inspection camera, an orientation signal measuring the orientation of inspection image captured by the inspection camera relative to an upright, earth normal orientation. |

Receive the video signal and orientation signal at a processing element having one or more graphics processing units (GPUs) or other processors. *1230*

Determine a graphics library (GL) surface mapped on the processing element onto which the inspection images are rendered such that the GL surface represents a field of view captured in the inspection image by the inspection camera that is a regular polygonal shape or is made to be a regular polygonal shape via cropping, reducing image sizes, or stretching of video images to fit the GL surface shape. *1240*

Determine, via the processing element, an orientation correction that describes rotations of the GL surface in increments equal to the measure of the central angle such that a corrected video includes orientation corrections that most closely resembles the inspection image having an upright, earth normal orientation. *1250*

Generate, via the processing element, a computer animation transition illustrating sequential rotation steps in the degree and direction of orientation correction rotations comprising one or more inspection images from the video signal at one or more points in times and space in the inspection video (*e.g.*, using method 630 of FIG. 6B or the method 730 of FIG. 7B). *1260*

Output a corrected video signal that includes an upright, earth normal oriented video along the most upright rotation correction increment that further includes a computer animation transition where each orientation correction rotation occurs. *1270*

Optionally store the corrected upright video having computer animation transitions and associated data in one or more non-transitory memories. *1280*

Display, on one or more electronic display devices, the corrected upright video having computer animation transitions from the corrected video signal in real-time, near real-time, or in playback. *1290*

FIG. 12

SYSTEMS AND METHODS FOR INSPECTION ANIMATION

CROSS-REFERENCE TO RELATED APPLICATIONS

This application claims priority under 35 U.S.C. § 119(e) to U.S. Provisional Patent Application Ser. No. 63/370,760 entitled SYSTEMS AND METHODS FOR INSPECTION ANIMATION, filed on Aug. 8, 2022, and Ser. No. 63/485,905 entitled SYSTEMS AND METHODS FOR INSPECTION ANIMATION, filed on Feb. 18, 2023, the contents of which are hereby incorporated by reference herein in their entirety for all purposes.

FIELD

This disclosure relates generally to computer animation transition methods and systems in the leveling of a video to an upright, earth normal orientation. More specifically, but not exclusively, the disclosure relates to computer animation transition methods and systems in the leveling of a video to an upright, earth normal orientation as used in pipe inspections.

BACKGROUND

There are many applications where a video camera may be used to generate a video of a target or scene that may be viewed by a viewer in either real-time or in playback. In many such applications, it may be advantageous for the observed video to have an "upright" or earth normal orientation in order to facilitate ease in viewing, help visually orient the viewer, and may help prevent neck strain from having to cock their head to the side to bring an image closer to normal. For instance, in video pipe inspection systems, a camera may be affixed to one end of a resilient flexible push-cable such that the inspection camera may deployed into a pipe or other void that may otherwise be difficult to access for the purposes of inspection. The push-cable may distribute electrical power to the inspection camera as well as communicate a video signal with an electronic display device on the opposite end of the push-cable for the purpose of displaying and recording the video and, in some known systems, other in-pipe data gathered by the sensors in or near the camera. The inspection camera may twist and turn as it is moved through bends and turns in the pipe or other void. As the inspection camera twists and turns, the orientation of the frame of view captured by the inspection camera may likewise twist and turn causing a viewer to become disoriented to the upright, earth normal orientation.

Solutions to rectify the orientation of a video to being upright and earth normal are known in the art though such known solutions are less than ideal. In at least one solution known in the art, the camera may be configured to mechanically self-level. For instance, such inspection cameras may include a camera body that is mounted for free rotation within a camera housing and a leveling weight that is physically attached to the camera body. The center of mass of the weight is displaced from the axis of rotation of the camera body so that the camera body may be leveled via gravitational forces. However, this design does not lend itself to easy removal and/or repair of the video camera and associated electronics within the camera head. Likewise, such designs may lack the ruggedness desirable in an inspection camera commonly used in harsh environments such as one might find inside a corroded pipe.

In the past, there have also been electronic solutions to the problem of orienting a video image from a remote video camera. If one is only interested in a rotation of one hundred and eighty degrees (the coarsest rotation—commonly called a screen flip), this can easily be done in one of two ways. The video transmitted by the camera can be converted to a digital format and remapped so that it is presented with what was originally the lower, right most pixel, remapped to the upper left most corner, and so on. The remapped digital data can then be reconverted to analog form. Alternatively in the case of a monitor having a cathode ray tube, the vertical and horizontal gun polarity can be reversed. Instead of scanning from left to right, top to bottom, the guns scan right to left, bottom to top. Either approach yields the same effect of rotating the video from the camera by one hundred and eighty degrees.

A digital flip and/or mirror is also commonly used both in LCD monitors as well as in some CCD cameras. One advantage of doing the flip before recording is that the corrected image is then recorded. Pipe inspection systems in use today that invert the image on the monitor do not allow the inverted image to be recorded. The main advantages of the flip approach are low cost and preservation of the original aspect ratio of the video (typically 4:3). The primary disadvantage is the limited rotational resolution (only offering two positions—0 degrees and 180 degrees of rotation).

Some manufacturers of video equipment have taken a video stream, converted it into a digital format, performed a matrix operation on the digital data to rotate the entire image by a predetermined amount, and then re-converted the digital date to an analog signal. This approach is optimal in terms of the rotational resolution, however it is extremely computationally intense, and therefore requires a significant cost in parts and power. It also suffers from the drawback that the rectangular 4:3 array is clipped so that some video content is lost at any angles other than zero and one hundred and eighty degrees. At rotations of ninety and two hundred and seventy degrees, the entire right and left lobes of the source video are lost.

In further solutions known in the art of video pipe inspection, a video signal may be converted to a digital format and a rectangular rotation at ninety degree increments may be performed via a processor (e.g., GPU or other processor) based on the output signal from the orientation sensor. Further, such solutions disclose various methods of cropping, reducing video image sizes, or stretching of video images to handle aspect ratios of video images having differences in horizontal to vertical image sizes measurements. Whereas such solutions are far less computationally intense, and therefore, require far less expense in parts and power, these solutions tend to momentarily disorient the viewer when such rotations in ninety degree increments occur. Further, such solutions tend to be carried out in hardware and may be tailored to a specific electronic display device. For instance, such an approach in a pipe inspection system may be carried out in a camera control unit (CCU) or similar display customized for rotation based on specific applications and hardware thus such solutions fail to be readily portable to other electronic display devices. Further, such solutions are limited to rectangular areas of rotation. Such problems are compounded in pipe inspection systems and similar systems where rotating inspection video images may share the same display interface as other non-rotating information.

Also, there is often a mismatch between the aspect ratio of the camera, and the aspect ratio of the display to be used. This tends to prevent the original as captured image to completely cover the display. This problem may be compounded if the viewer changes display modes from portrait (vertical) to landscape (horizontal). Previous attempts to correct or reconcile this deficiency have included scaling the image to fit the display which leaves regions of the display uncovered by the original image (blank or covered by background). Alternatively, the image may be sized to fit the full display area by stretching or otherwise extending it to cover the entire display area which results in distortion of the original image. Other attempts have included scaling the original image in a manner that prevents the distortion by extending the image completely over the display area, and then discarding any portion of the original image that does not fit the display. This results in the viewer seeing an inaccurate image, that is an image that is not the same as the original captured image.

Accordingly, there is a need in the art to address the above-described as well as other problems.

SUMMARY

In accordance with one aspect of the present invention a method for leveling of video that includes one or more computer animation transitions as used in inspection systems is disclosed. The method may include generating, via one or more image sensors disposed in an inspection camera, a video signal comprising a plurality of sequential inspection images and, via one or more orientation sensors disposed in the inspection camera, an orientation signal measuring the orientation of the inspection image relative to an upright, earth normal orientation. The method may also include receiving the video signal and orientation signal at a processing element having one or more processors. The method may further include determining, via the processing element, an orientation correction that describes rotations of the inspection image(s) in ninety degree increments about a centroid such that a corrected video includes orientation corrections that most closely resembles an upright, earth normal orientation. The method embodiments may further include generating a computer animation transition illustrating sequential rotation steps in the degree and direction of the orientation correction rotations comprising one or more inspection images from the video signal at one or more points in times and space in the inspection video. In some method embodiments, the rotation correction may use the same inspection image at each sequential rotation step. In other embodiments, the method may use different inspection images at the rotation step from different points in time or space in the inspection. In some such embodiments, each different inspection image may be the current inspection image generated at the inspection camera. The method may include cropping, reducing in size, stretching, or otherwise resizing the inspection image to fit the display interface on the electronic display device at each rotation interval. Method embodiments may further include outputting a corrected video signal that includes an upright, earth normal oriented video along the most upright ninety degree rotation increment that further includes one or more computer animation transitions where orientation correction rotations occur. The method may further include displaying, on one or more electronic display devices, the corrected upright video having computer animation transitions from the corrected video signal.

In accordance with one aspect of the present invention a method of computer animation transitions as used in inspection systems is disclosed. The method may include generating, via one or more image sensors disposed in an inspection camera, a video signal comprising a plurality of sequential inspection images and, via one or more orientation sensors disposed in the inspection camera, an orientation signal measuring the orientation of the inspection image relative to an upright, earth normal orientation. The method may also include receiving the video signal and orientation signal at a processing element having one or more processors. Further, the method may include determining, via the processing element, a GL surface that is square in shape mapped onto the processing element (e.g., one or more GPUs or the like) containing all or a portion of the field of view captured in the video signal from the inspection camera. The method may further include determining, via the processing element, an orientation correction that describes rotations of the field of view captured in the GL surface in ninety degree increments about a centroid such that a corrected video includes orientation corrections that most closely resembles an upright, earth normal orientation. In some method embodiments in keeping with the present disclosure, the GL surface may be any regular polygon in shape and such orientation corrections may occur at increments equal to the central angle measurement of the polygonal shape about a centroid thereof. The method embodiments may further include generating a computer animation transition illustrating sequential steps of the degree and direction of orientation correction rotations comprising one or more inspection images from the video signal at one or more points in times and space in the inspection video. Method embodiments may further include outputting a corrected video signal that includes an upright, earth normal oriented video along the most upright ninety degree rotation increment that further includes one or more computer animation transitions where orientation correction rotations occur. Such methods of the present disclosure may further include displaying, on one or more electronic display devices, the corrected upright video having computer animation transitions from the corrected video signal.

In accordance with another aspect of the invention, an inspection system including video leveling having computer animation transitions is disclosed. The inspection system may include an inspection camera having an imaging element that includes one or more imaging sensors positioned behind one or more lenses and disposed in a housing in generating a video signal. The inspection camera may further include an orientation element having one or more orientation sensors in generating an orientation signal describing the orientation of the field of view of the video relative to upright, earth normal orientation.

The inspection system may include an electronic display device having a processing element that includes one or more processors receiving the video signals and orientation signals from the inspection camera and may be configured to output a corrected video signal having a corrected, upright, earth normal video that includes one or more video leveling instances that each include a computer animation transition. The display device may further include a memory element having one or more non-transitory memories in storing instructions related to generating a corrected video signal including one or more video leveling computer animation transitions and the resulting corrected video signal including one or more video leveling computer animation transitions. The electronic display device may include a display interface to display the corrected, upright, earth normal video including one or more video leveling computer animation transitions of the corrected video signal.

In accordance with another aspect of the invention, an inspection system may include video leveling, and more specifically digital self-leveling, which may be or share aspects with those disclosed in for example, U.S. Pat. No. 8,587,648, issued Nov. 19, 2013, entitled SELF-LEVELING CAMERA HEAD; and U.S. Pat. No. 9,927,368, issued Mar. 27, 2021, entitled SELF-LEVELING INSPECTION SYSTEMS AND METHODS, and/or other incorporated patents and applications.

When using digital self-leveling in a pipe inspection camera, images may be captured through a full 360 degrees of rotation of the camera head which may be actively rotating during an inspection. Note that this provides for image capturing with a full 360 degrees of rotation, not just 180 degrees of rotation, and then inverting the camera head to pick up the symmetry. The utility pipe inspection camera head, therefore, may be dynamically (actively) rotating in a pipe, conduit, or other void, thereby capturing a spinning image.

Typically, based on the position or pose of the camera head when an image is captured, the image will need to be rotated in order to fit the orientation of the display. Images may also need to be scaled to fit the display. The steps of rotating and scaling of one or more images may be done in either order, or simultaneously, by one or more processors. There often exists a mismatch between the aspect ratio of the camera or image sensors, and the display to be used. This mismatch may cause regions of the display (gaps) to be uncovered by the image, and left blank, that is they are filled in with a background that is not part of the image. The contrast of the actual image with the background at the transition, i.e. the point where the image stops, and the background begins, will be harsh, i.e. not smooth (visually pleasing) to the viewer. The transition between the image and the display background may be smoothed out by filling in the non-image regions (boundary extension) with a chosen image or background which makes the transition seem to fade away. That is, the transition will be more pleasing to the eye of a viewer.

Another way to look at it is that by extending non-image regions into the actual region, it will make the contrast of the barrier between the image and the background (non-image area) less disruptive. Extending the boundary of an image (boundary extension) may include applying editing techniques to the image such as scaling, pixel averaging, image mirroring, and any other image extension techniques. Gaps between the image and the display area may be filled in with real-time images or stored images, and may include displaying a real-time image while filling in the gap with a previous image from the same stream or sequence as the real-time image being displayed.

In one aspect of the invention, a background image is chosen. Images may be chosen from the image or image stream to be displayed, or another desired background image may be used. Background images that are closest to the actual image will provide the most natural transition because they will be similar in characteristics such as color, tone, texture, angle, lighting, etc. The chosen background image is then fit to the size of the image display.

Fitting of the background image to the display screen may include rotating, aligning, extending (stretching), and/or scaling (enlarging or minimizing), cropping, or otherwise editing the image to completely cover the background. Then the background image may be blurred using a Gaussian Filter, or other well known blurring techniques, algorithms, or filters, such as provided in Adobe PhotoShop, or other readily available applications to blur, soften, smooth, or distort the image. The actual image, or image stream, is then overlaid on the background to render a single image to the viewer. The blurring effect will ensure a smooth image transition between the actual image and the background while preventing the viewer from confusing the background image data from real image data. As an alternative to using a blurring effect, pixel averaging techniques may be used to fill in the background with the average color (e.g. computing an average or arithmetic mean of the intensity values for each pixel position in a set of captured images from the same scene or view field) to smooth the transition.

The actual image may be a single image or a plurality of sequential images (a video stream) generated via one or more image sensors disposed in a utility pipe inspection camera. Different inspection images from a rotating camera head may be taken from different points in time or space in the inspection. The background image or images may be the same actual captured image, a different captured image, an image captured from a different camera or photo sensor, or an image retrieved from a memory, database, or the cloud.

In accordance with another aspect of the invention, the display may include a mobile device such as a cellular phone (cell phone), mobile phone, or smart phone, and processing of any images may be performed by hardware existing on the mobile device. Live video may be sent from a pipe inspection camera, and received as sensor data by a mobile device in real-time or near real-time. The mobile phone or smart phone may have its own orientation sensors, and data from the inspection camera sensors and the phone sensors may be be combined to provide a righted view on a display, especially a view that minimizes computational complexity to maximize processor and memory efficiency.

In accordance with another aspect of the invention, smoothing of the transition between the actual image and the background may include creating a composite image by mirroring a single image around itself to create multiple frames, and then editing the image using blurring and other techniques to smooth the transition between the edges of the image itself and the mirrored frames. Mirroring an image provides a memory-efficient implementation, because you do not have to store multiple frames in memory you just retrieve the frame that is needed.

In accordance with another aspect of the invention, a visual perception view may be provided using the image previously created using multiple frames, by editing the final image created to look like it is bending in towards the viewer, thereby creating an effect that the viewer would see if he was moving at the same the as the camera as it moves through a pipe, conduit, or void.

In accordance with another aspect of the invention, smoothing of the transition between an actual image or image stream, and the background, may also include adjusting the focus view of the background to compensate for a camera or optical sensor which has dynamic zoom functionality.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 6B is an embodiment of a method for generating a computer animation transition from a single inspection image captured at one point in time in the inspection video.

FIG. 12 is an embodiment of a method for leveling of an inspection video that includes computer animation transitions.

DETAILED DESCRIPTION OF EMBODIMENTS

Overview

Figure 1A:
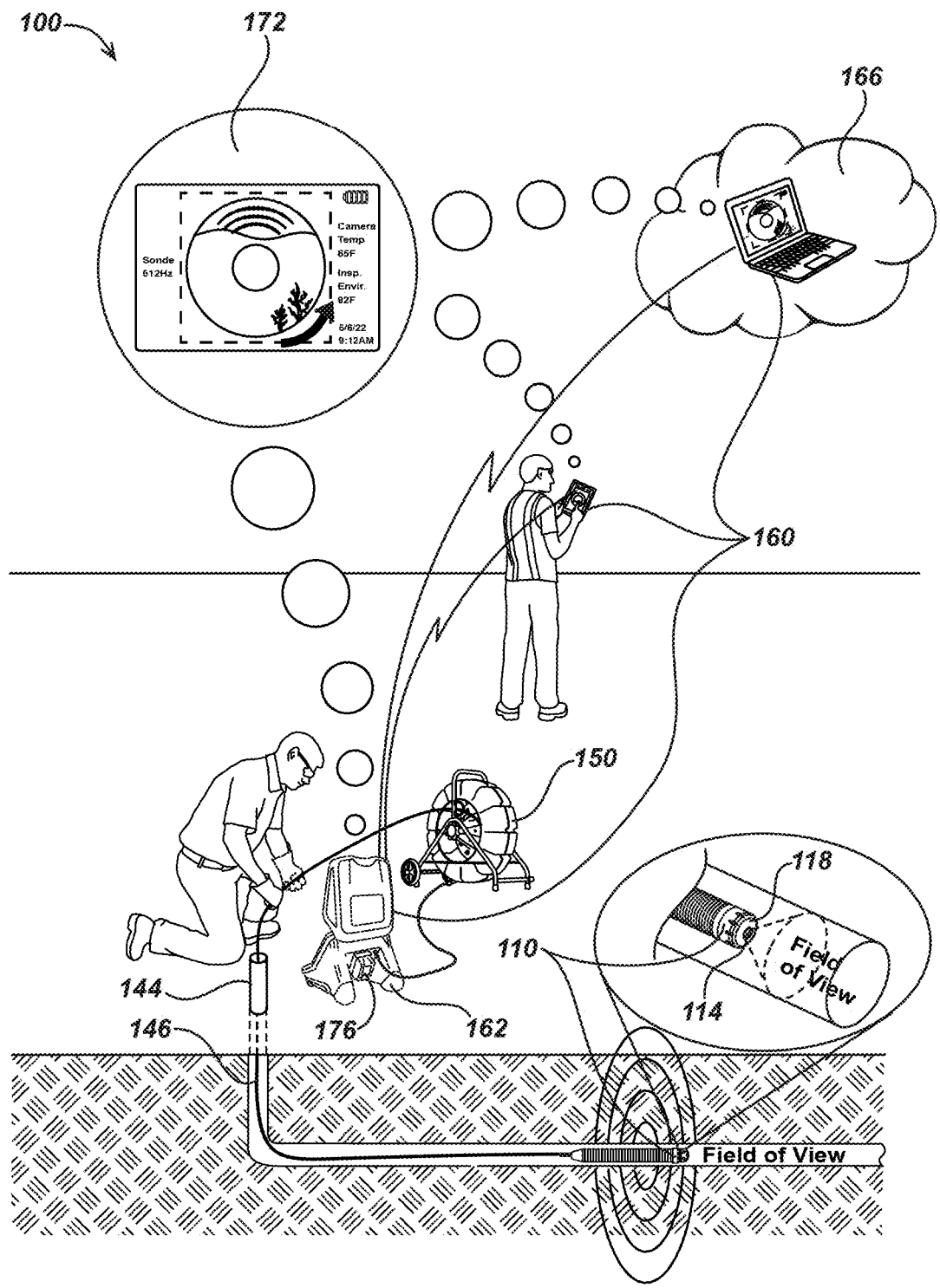
FIG. 1A is an illustration of an embodiment of an inspection system which may include video leveling computer animation transitions in keeping with the present disclosure.

In accordance with one aspect of the present invention method for leveling of video that includes one or more computer animation transitions as used in inspection systems is disclosed. The method may include generating, via one or more image sensors disposed in an inspection camera, a video signal comprising a plurality of sequential inspection images and, via one or more orientation sensors disposed in the inspection camera, an orientation signal measuring the orientation of the inspection image relative to an upright, earth normal orientation. The method may also include receiving the video signal and orientation signal at a processing element having one or more processors. The method may further include determining, via the processing element, an orientation correction that describes rotations of the inspection image(s) in ninety degree increments about a centroid such that a corrected video includes orientation corrections that most closely resembles an upright, earth normal orientation. The method embodiments may further include generating a computer animation transition illustrating sequential rotation steps in the degree and direction of the orientation correction rotations comprising one or more inspection images from the video signal at one or more points in times and space in the inspection video. In some method embodiments, the rotation correction may use the same inspection image at each sequential rotation step. In other embodiments, the method may use different inspection images at the rotation step from different points in time or space in the inspection. In some such embodiments, each different inspection image may be the current inspection image generated at the inspection camera. The method may include cropping, reducing in size, stretching, or otherwise resizing the inspection image to fit the display interface on the electronic display device at each rotation interval. Method embodiments may further include outputting a corrected video signal that includes an upright, earth normal oriented video along the most upright ninety degree rotation increment that further includes one or more computer animation transitions where orientation correction rotations occur. The method may further include displaying, on one or more electronic display devices, the corrected upright video having computer animation transitions from the corrected video signal.

In accordance with one aspect of the present invention a method for video leveling computer animation transitions as used in inspection systems is disclosed. The method may include generating, via one or more image sensors disposed in an inspection camera, a video signal comprising a plurality of sequential inspection images and, via one or more orientation sensors disposed in the inspection camera, an orientation signal measuring the orientation of the inspection images captured by the inspection camera relative to an upright, earth normal orientation. It should be noted that orientations other than an upright, earth normal orientation could be used, if so desired.

The method may also include receiving the video signal and orientation signal at a processing element having one or more processors which may include one or more graphical processing units (GPUs).

Further, the method may include determining a graphics library (GL) surface mapped on the processing element onto which the inspection images are rendered such that the GL surface represents a field of view captured in the video signal from the inspection camera that is or is made to be square in shape. Here, graphics library refers broadly to scaling, translation, rotation, and other common transformations and techniques performed in image processing. Inspection images may be cropped, stretched, reduced in size, or otherwise resized to fit the GL surface. Images may likewise be augmented in other ways to enhance suitability for continuous rotation, such as extending or extrapolating boundaries by computational photography or artificial intelligence techniques. Such extensions may be obtained by operations on previously acquired images, or by a machine learning model.

The method may further include determining, via the processing element, an orientation correction that describes rotations of the GL surface in ninety degree increments about a centroid such that a corrected video includes orientation corrections that most closely resembles an upright, earth normal orientation. In some method embodiments in keeping with the present disclosure, the GL surface may be a three dimensional shape matching the cylindrical shape of the inspected pipe and rotation corrections occur about the axis of the cylindrical pipe shape. In further method embodiments in keeping with the present disclosure, the GL surface may be any regular polygon in shape and such orientation corrections may occur at increments equal to the central angle measurement of the polygonal shape about a centroid thereof. The method embodiments may further include generating a computer animation transition illustrating sequential rotation steps in the degree and direction of orientation correction rotations comprising one or more inspection images from one or more points in times and space in the inspection video. Method embodiments may further include outputting a corrected video signal that includes an upright, earth normal oriented video along the most upright ninety degree rotation increment. Each rotation correction of the corrected video may further include one or more computer animation transitions where orientation correction rotations occur. Such methods of the present disclosure may further include displaying, on one or more electronic display devices, the corrected upright video having computer animation transitions from the corrected video signal. The corrected upright video having computer animation transitions and associated data may optionally be stored in one or more non-transitory memories.

In another aspect, in some method embodiments the orientation corrections are generated from a single inspection image from the video signal from a single point in time and space in the inspection video. In other method embodiments, orientation corrections may be generated from a plurality of inspection images from the video signal captured at successive points in time and space.

In another aspect, the method may be carried out and displayed in real-time or near real-time. In other method embodiments, the corrected upright video having computer animation transitions may be stored in one or more non-transitory memories and the method may be carried out in post-processing in one or more electronic display devices.

In another aspect, the display interface may include the inspection image may rotate independently of other non-rotating additional information during computer animation transitions for leveling video to upright, earth normal orientation. For instance, in some such embodiments inspection data may appear in such a non-rotating display area (e.g., information regarding status of system devices, battery power gauges, system device temperature, in-pipe or other inspection environment temperatures, mapping or position of the inspection camera, or the like).

In accordance with another aspect of the invention, an inspection system including video leveling computer animation transitions is disclosed. The inspection system may include an inspection camera having an imaging element that includes one or more imaging sensors positioned behind one or more lenses and disposed in a housing in generating a video signal. The inspection camera may further include an orientation element having one or more orientation sensors in generating an orientation signal describing the orientation of the field of view of the video relative to upright, earth normal orientation.

The inspection system may include an electronic display device having a processing element that includes one or more processors receiving the video signals and orientation signals from the inspection camera and may be configured to output a corrected video signal having a corrected, upright, earth normal video that includes one or more video leveling computer animation transitions. In some embodiments the processing element may include one or more graphical processor units (GPUs). Further, in some embodiments, such a processing element may be disposed in and processing of data may fully or partially be carried out in a remotely connected computing device. The display device may further include a memory element having one or more non-transitory memories in storing instructions related to generating a corrected video signal including one or more video leveling computer animation transitions and the resulting corrected video signal including one or more video leveling computer animation transitions. The electronic display device may include a display interface to display the corrected, upright, earth normal video including one or more video leveling computer animation transitions of the corrected video signal.

Details of example devices, systems, and methods that may be used in or combined with the computer animation transition methods and system in the leveling of a video to an upright, earth normal orientation as used in pipe inspections embodiments described herein, are disclosed in co-assigned patents and patent applications including: U.S. Pat. No. issued Aug. 17, 1999, entitled VIDEO PUSH-CABLE; U.S. Pat. No. 6,545,704, issued Jul. 7, 1999, entitled VIDEO PIPE INSPECTION DISTANCE MEASURING SYSTEM; U.S. Pat. No. 6,831,679, issued Dec. 14, 2004, entitled VIDEO CAMERA HEAD WITH THERMAL FEEDBACK LIGHTING CONTROL; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 6,862,945, issued Mar. 8, 2005, entitled CAMERA GUIDE FOR VIDEO PIPE INSPECTION SYSTEM; U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 7,864,980, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,151, issued Jun. 28, 2011, entitled PRE-AMPLIFIER AND MIXER CIRCUITRY FOR A LOCATOR ANTENNA; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 8,289,385, issued Oct. 16, 2012, entitled PUSH-CABLE FOR PIPE INPECTION SYSTEM; U.S. patent application Ser. No. 13/769,202, filed Feb. 15, 2013, entitled SMART PAINT STICK DEVICES AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,395,661, issued Mar. 12, 2013, entitled PIPE INSPECTION SYSTEM WITH SELECTIVE IMAGE CAPTURE; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/033,349, filed Sep. 20, 2013, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUDLY INDICATING THE DIFFERENT LOCATIONS TO A USER; U.S. Pat. No. 8,587,648, issued Nov. 19, 2013, entitled SELF-LEVELING CAMERA HEAD; U.S. patent application Ser. No. 14/148,649, filed Jan. 6, 2014, entitled MAPPING LOCATING SYSTEMS & METHODS; U.S. Pat. No. 8,635,043, issued Jan. 21, 2014, entitled LOCATOR AND TRANSMITTER CALIBRATION SYSTEM; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 8,841,912, issued Sep. 23, 2014, entitled PRE-AMPLIFIER AND MIXER CIRCUITRY FOR A LOCATOR ANTENNA; U.S. Pat. No. 8,908,027, issued Dec. 9, 2014, entitled ASYMMETRIC DRAG FORCE BEARING FOR USE WITH A PUSH-CABLE STORAGE DRUM; U.S. Pat. No. 8,970,211, issued Mar. 3, 2015, entitled PIPE INSPECTION CABLE COUNTER AND OVERLAY MANAGEMENT SYSTEM; U.S. Pat. No. 8,984,698, issued Mar. 24, 2015, entitled LIGHT WEIGHT SEWER CABLE; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. Pat. No. 9,081,109, issued Jul. 14, 2015, entitled GROUND-TRACKING DEVICES FOR USE WITH A MAPPING LOCATOR; U.S. Pat. No. 9,080,992, issued Jul. 14, 2015, entitled ADJUSTABLE VARIABLE RESOLUTION INSPECTION SYSTEMS AND METHODS; U.S. Pat. No. 9,082,269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR POR- TABLE LOCATOR; U.S. Pat. No. 9,207,350, issued Dec. 8, 2015, entitled BURIED OBJECT LOCATOR APPARATUS WITH SAFETY LIGHTING ARRAY; U.S. Pat. No. 9,222,809, issued Dec. 29, 2015, entitled PORTABLE PIPE INSPECTION SYSTEMS AND APPARATUS; U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPATUS, SYSTEMS, AND METHODS; U.S. Pat. No. 9,411,066, issued Aug. 9, 2016, entitled SONDES & METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued Oct. 18, 2016, entitled PIPE INSPECTION SYSTEM WITH JETTER PUSH-CABLE; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. Pat. No. 9,521,303, issued Dec. 13, 2016, entitled CABLE STORAGE DRUM WITH MOVABLE CCU DOCKING APPARATUS; U.S. patent application Ser. No. 15/846,102, filed Dec. 16, 2016, entitled SYSTEMS AND METHODS FOR ELECTRONICALLY MARKING, LOCATING AND VIRTUALLY DISPLAYING BURIED UTILITIES; U.S. patent application Ser. No. 15/866,360, filed Jan. 9, 2017, entitled TRACKABLE DISTANCE MEASURING DEVICES, SYSTEMS, AND METHODS; U.S. Pat. No. 9,927,368, issued Mar. 27, 2021, entitled SELF-LEVELING INSPECTION SYSTEMS AND METHODS; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,202, issued Apr. 25, 2017, entitled ECONOMICAL MAGNETIC LOCATOR APPARATUS AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); U.S. patent application Ser. No., filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; U.S. patent application Ser. No., filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT LOCATING METHODS AND APPARATUS USING MULTIPLE ELECTROMAGNETIC SIGNALS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,703,002, issued Jun. 11, 2017, entitled UTILITY LOCATOR SYSTEMS & METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. patent application Ser. No. 15/681,250, filed Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE & CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,769,366, issued Sep. 29, 2017, entitled SELF-GROUNDING TRANSMITTER PORTABLE CAMERA CONTROLLER FOR USE WITH PIPE INSPECTION SYSTEMS; U.S. Pat. No. 9,784,837, issued Oct. 10, 2017, entitled OPTICAL GROUND TRACKING APPARATUS, SYSTEMS & METHODS; U.S. Pat. No. 9,798,033, issued Oct. 24, 2017, entitled SONDE DEVICES INCLUDING A SECTIONAL FERRITE CORE; U.S. patent application Ser. No. 15/811,361, filed Nov. 13, 2017, entitled OPTICAL GROUND-TRACKING APPARATUS, SYSTEMS, AND METHODS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. patent application Ser. No. 16/255,524, filed Jan. 23, 2018, entitled RECHARGEABLE BATTERY PACK ONBOARD CHARGE STATE INDICATION METHODS AND APPARATUS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,914,157, issued Mar., 13, 2018, entitled METHODS AND APPARATUS FOR CLEARING OBSTRUCTIONS WITH A JETTER PUSH-CABLE APPARATUS; U.S. patent application Ser. No. 15/925,643, issued Mar. 19, 2018, entitled PHASE-SYNCHRONIZED BURIED OBJECT TRANSMITTER AND LOCATOR METHODS AND APPARATUS; U.S. patent application Ser. No. 15/925,671, issued Mar. 19, 2018, entitled MULTI-FREQUENCY LOCATING SYSTEMS AND METHODS; U.S. patent application Ser. No. 15/936,250, filed Mar. 26, 2018, entitled GROUND TRACKING APPARATUS, SYSTEMS, AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 9,880,309, issued Mar. 28, 2018, entitled UTILITY LOCATOR TRANSMITTER APPARATUS & METHODS; U.S. patent application Ser. No. 16/382,136, filed Apr. 11, 2018, entitled GEOGRAPHIC MAP UPDATING METHODS AND SYSTEMS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Pat. No. 9,989,662, issued Jun. 5, 2018, entitled BURIED OBJECT LOCATING DEVICE WITH A PLURALITY OF SPHERICAL SENSOR BALLS THAT INCLUDE A PLURALITY OF ORHTOGONAL ANTENNAE; U.S. patent application Ser. No. 16/443,789, filed Jun. 18, 2018, entitled MULTI-DIELECTRIC COAXIAL PUSH-CABLES AND ASSOCIATED APPARATUS; U.S. Pat. No. 10,001,425, issued Jun. 19, 2018, entitled PORTABLE CAMERA CONTROLLER PLATFORM FOR USE WITH PIPE INSPECTION SYSTEM; U.S. Pat. No. 10,009,582, issued Jun. 26, 2018, entitled PIPE INSPECTION SYSTEM WITH REPLACEABLE CABLE STORAGE DRUM; U.S. patent application Ser. No. 16/036,713, issued Jul. 16, 2018, entitled UTILITY LOCATOR APPARATUS AND SYSTEMS; U.S. Pat. No. 10,027,526, issued Jul. 17, 2018, entitled METHOD AND APPARATUS FOR HIGH-SPEED DATA TRANSFER EMPLOYING SELF-SYNCHRONIZING QUADRATURE AMPLITUDE MODULATION; U.S. Pat. No. 10,024,994 issued Jul. 17, 2018, entitled WEARABLE MAGNETIC FIELD UTILITY LOCATOR SYSTEM WITH SOUND FIELD GENERATION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504 issued Aug. 28, 2018, entitled MARKING PAINT APPLICATOR FOR USE WITH PORTABLE UTILITY LOCATOR; U.S. patent application Ser. No. 16/049,699, filed Jul. 30, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 16/121,379, filed Sep. 4, 2018, entitled KEYED CURRENT SIGNAL UTILITY LOCATING SYSTEMS AND METHODS; U.S. patent application Ser. No. 16/125,768, filed Sep. 10, 2018, entitled BURIED OBJECT LOCATOR APPARATUS AND METHODS; U.S. Pat. No. 10,073,186 issued Sep. 11, 2018, entitled KEYED CURRENT SIGNAL UTILITY LOCATING SYSTEMS AND METHODS; U.S. patent application Ser. No. 16/133,642, issued Sep. 17, 2018, entitled MAGNETIC UTILITY LOCATOR DEVICES AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCATOR DEVICES & METHODS; U.S. Pat. No. 10,082,599, issued Sep. 25, 2018, entitled MAGNETIC SENSING BURIED OBJECT LOCATOR INCLUDING A CAMERA; U.S. Pat. No. 10,090,498 issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/160,874, filed Oct. 15, 2018, entitled TRACKABLE DIPOLE DEVICES, METHODS, AND SYSTEMS FOR USE WITH MARKING PAINT STICKS; U.S. Pat. No. 10,100,507, issued Oct. 16, 2018, entitled PIPE CLEARING CABLES AND APPARATUS; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. patent application Ser. No. 16/222,994, filed Dec. 17, 2018, entitled UTILITY LOCATORS WITH RETRACTABLE SUPPORT STRUCTURES AND APPLICATIONS THEREOF; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. patent application Ser. No. 16/810,788, filed Mar. 5, 2019, entitled MAGNETICALLY RETAINED DEVICE HANDLES; U.S. Pat. No. issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. patent application Ser. No. 16/390,967, filed Apr. 22, 2019, entitled UTILITY LOCATING SYSTEMS WITH MOBILE BASE STATION; U.S. Pat. No. 10,288,997, issued May 14, 2019, entitled ROTATING CONTACT ASSEMBLIES FOR SELF-LEVELING CAMERA HEADS; U.S. patent application Ser. No. 29/692,937, filed May 29, 2019, entitled BURIED OBJECT LOCATOR; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/455,491, filed Jun. 27, 2019, entitled SELF-STANDING MULTI-LEG ATTACHMENT DEVICES FOR USE WITH UTILITY LOCATORS; U.S. Pat. No. 10,353,103, issued Jul. 16, 2019, entitled SELF-STANDING MULTI-LEG ATTACHMENT DEVICES FOR USE WITH UTILITY LOCATORS; U.S. Pat. No. 10,371,305, issued Aug. 6, 2019, entitled DOCKABLE TRIPODAL CAMERA CONTROL UNIT; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. Pat. No.

10,324,188, issued Oct. 9, 2019, entitled OPTICAL GROUND TRACKING APPARATUS, SYSTEMS, AND METHODS FOR USE WITH BURIED UTILITY LOCATORS; U.S. patent application Ser. No. 16/446,456, filed Jun. 19, 2019, entitled DOCKABLE TRIPODAL CAMERA CONTROL UNIT; U.S. patent application Ser. No. 16/520,248, filed Jul. 23, 2019, entitled MODULAR BATTERY PACK APPARATUS, SYSTEMS, AND METHODS; U.S. Pat. No. 10,371,305, issued Aug. 6, 2019, entitled DOCKABLE TRIPODAL CAMERA CONTROL UNIT; U.S. patent application Ser. No. 16/559,576, filed Sep. 3, 2019, entitled VIDEO PIPE INSPECTION SYSTEMS WITH VIDEO INTEGRATED WITH ADDITIONAL SENSOR DATA; U.S. patent application Ser. No. 16/588,834, Filed Sep. 30, 2019, Entitled VIDEO INSPECTION SYSTEM WITH WIRELESS ENABLED CABLE STORAGE DRUM; U.S. Pat. No. 10,440,332 issued Oct. 8, 2019, entitled INSPECTION CAMERA DEVICES AND METHODS WITH SELECTIVELY ILLUMINATED MULTISENSOR IMAGING; U.S patent application Ser. No. 16/676,292, filed Nov. 6, 2019, entitled ROBUST IMPEDANCE CONTROLLED SLIP RINGS; U.S. Pat. No. 10,490,908, issued Nov. 26, 2019, entitled DUAL ANTENNA SYSTEMS WITH VARIABLE POLARIZATION; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/773,952, filed Jan. 27, 2020, entitled MAGNETIC FIELD CANCELING AUDIO DEVICES; U.S. patent application Ser. No. 16/780,813, filed Feb. 3, 2020, entitled RESILIENTLY DEFORMABLE MAGNETIC FIELD CORE APPARATUS AND APPLICATIONS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UNIQUELY IDENTIFYING BURIED UTILITIES IN A MULTI-UTILITY ENVIRONMENT; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. patent application Ser. No. 16/791,979, issued Feb. 14, 2020, entitled MARKING PAINT APPLICATOR APPARATUS; U.S. patent application Ser. No. 16/792,047, filed Feb. 14, 2020, entitled SATELLITE AND MAGNETIC FIELD SONDE APPARATUS AND METHODS; U.S Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEMS; U.S. Pat. No. 10,569,952, issued Feb. 25, 2020, entitled MARKING PAINT APPLICATOR FOR USE WITH PORTABLE UTILITY LOCATOR; U.S. patent application Ser. No. 16/827,672, filed Mar. 23, 2020, entitled DUAL ANTENNA SYSTEMS WITH VARIABLE POLARIZATION; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. patent application Ser. No. 17/235,507, filed Apr. 20, 2021, entitled UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/902,249, filed Jun. 15, 2020, entitled USER INTERFACES FOR UTILITY LOCATORS; U.S. Provisional Patent Application 63/212,713, filed Jun. 20, 2021, entitled DAYLIGHT VISIBLE AND MULTI-SPECTRAL LASER RANGEFINDER AND ASSOCIATED METHODS AND UTIITY LOCATOR DEVICES; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. Pat. No. 10,690,796, issued Jun. 23, 2020, entitled USER INTERFACES FOR UTILITY LOCATORS; U.S. patent application Ser. No. 16/921,775, filed Jul. 6, 2020, entitled AUTO-TUNING CIRCUIT APPARATUS AND METHODS; U.S. Provisional Patent Application 63/055,278, filed Jul. 22, 2020, entitled VEHICLE-BASED UTILITY LOCATING USING PRINCIPAL COMPONENTS; U.S. patent application Ser. No. 17/397,940, filed Aug. 9, 2021, entitled INSPECTION SYSTEM PUSH-CABLE GUIDE APPARATUS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTLITITY LOCATOR INCLUDING A CAMERA; U.S. Pat. Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. Pat. No. 10,764,541, issued Sep. 1, 2020, entitled COAXIAL VIDEO PUSH-CABLES FOR USE IN INSPECTION SYSTEMS; U.S. patent application Ser. No.

17/013,831, filed Sep. 7, 2020, entitled MULTIFUNCTION BURIED UTILITY LOCATING CLIPS; U.S. patent application Ser. No. 17/014,646, filed Sep. 8, 2020, entitled INTEGRATED FLEX-SHAFT CAMERA SYSTEM AND HAND CONTROL; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. patent application Ser. No. 17/068,156, filed Oct. 12, 2020, entitled DUAL SENSED LOCATING SYSTEMS AND METHODS; U.S. Pat. No. 10,809,408, issued Oct. 20, 2020, entitled DUAL SENSED LOCATING SYSTEMS AND METHODS; U.S. Pat. No. 10,845,497, issued Nov. 24, 2020, entitled PHASE-SYNCHRONIZED BURIED OBJECT TRANSMITTER AND LOCATOR METHODS AND APPARATUS; U.S. Pat. No. 10,848,655, issued Nov. 24, 2020, entitled HEAT EXTRACTION ARCHITECTURE FOR COMPACT VIDEO CAMERA HEADS; U.S. patent application Ser. No. 17/110,273, filed Dec. 2, 2020, entitled INTEGRAL DUAL CLEANER CAMERA DRUM SYSTEMS AND METHODS; U.S. Pat. No. 10,859,727, issued Dec. 8, 2020, entitled ELECTRONIC MARKER DEVICES AND SYSTEMS; U.S. Pat. No. 10,908,311, issued Feb. 2, 2021, entitled SELF-STANDING MULTI-LEG ATTACHMENT DEVICES FOR USE WITH UTILITY LOCATORS; U.S. Pat. No. 10,928,538, issued Feb. 23, 2021, entitled KEYED CURRENT SIGNAL LOCATING SYSTEMS AND METHODS; U.S. Pat. No. 10,935,686, issued Mar. 2, 2021, entitled UTILITY LOCATING SYSTEM WITH MOBILE BASE STATION; U.S. patent application Ser. No. 17/190,400, filed Mar. 3, 2021, entitled DOCKABLE CAMERA REEL AND CCU SYSTEM; U.S. Pat. No. 10,955,583, issued Mar. 23, 2021, entitled BORING INSPECTION SYSTEMS AND METHODS; U.S. Pat. No. 9,927,368, issued Mar. 27, 2021, entitled SELF-LEVELING INSPECTION SYSTEMS AND METHODS; U.S. Pat. No. 10,976,462, issued Apr. 13, 2021, entitled VIDOE INPECTION SYSTEMS WITH PERSONAL COMMUNICATION DEVICE USER INTERFACES; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS; U.S. patent application Ser. No. 17/528,956, filed Nov. 17, 2021, entitled VIDEO INSPECTION SYSTEM, APPARATUS, AND METHODS WITH RELAY MODULES AND CONNECTION PORT; U.S. patent application Ser. No. 17/541,057, filed Dec. 2, 2021, entitled COLOR-INDEPENDENT MARKER DEVICE APPARATUS, METHODS, AND SYSTEMS; U.S. patent application Ser. No. 17/541,057, filed Dec. 2, 2021, entitled VIDEO INSPECTION SYSTEM, APPARATUS, AND METHODS WITH RELAY MODULES AND CONNECTION PORTCOLOR-INDEPENDENT MARKER DEVICE APPARATUS, METHODS, AND SYSTEMS; U.S. Pat. No. 11,193,767, issued Dec. 7, 2021, entitled SMART PAINT STICK DEVICES AND METHODS; U.S. Pat. No. 11,199,510, issued Dec. 14, 2021, entitled PIPE INSPECTION AND CLEANING APPARATUS AND SYSTEMS; U.S. Provisional Patent Application 63/293,828, filed Dec. 26, 2021, entitled MODULAR BATTERY SYSTEMS INCLUDING INTERCHANGEABLE BATTERY INTERFACE APPARATUS; U.S. Pat. No. 11,209,115, issued Dec. 28, 2021, entitled PIPE INSPECTION AND/OR MAPPING CAMERA HEADS, SYSTEMS, AND METHODS; U.S. patent application Ser. No. 17/563,049, filed Dec. 28, 2021, entitled SONDE DEVICES WITH A SECTIONAL FERRITE CORE; U.S. Provisional Patent Application 63/306,088, filed Feb. 2, 2022, entitled UTILITY LOCATING SYSTEMS AND METHODS WITH FILTER TUNING FOR POWER GRID FLUCTUATIONS; U.S. patent application Ser. No. 17/687,538, filed Mar. 4, 2022, entitled ANTENNAS, MULTI-ANTENNA APPARATUS, AND ANTENNA HOUSINGS; U.S. Pat. No. 11,280,934, issued Mar. 22, 2022, entitled ELECTROMAGNETIC MARKER DEVICES FOR BURIED OR HIDDEN USE; and U.S. Pat. No. 11,300,597, issued Apr. 12, 2022, entitled SYSTEMS AND METHODS FOR LOCATING AND/OR MAPPING BURIED UTILITIES USING VEHICLE-MOUNTED LOCATING DEVICES; U.S. Pat. No. 11,333,786, issued May 17, 2022, entitled BURIED UTILITY MARKER DEVICE, SYSTEMS, AND METHODS; U.S. patent application Ser. No. 17/845,290, filed Jun. 21, 2022, entitled DAYLIGHT VISIBLE AND MULTI-SPECTRAL LASER RANGEFINDER AND ASSOCIATED METHODS AND UTIITY LOCATOR DEVICES; and U.S. Pat. No. 11,366,245, issued Jun. 21, 2022, entitled BURIED UTILITY LOCATOR GROUND TRACKING APPARATUS, SYSTEMS, AND METHODS; U.S. Provisional Patent Application 63/368,879, filed Jul. 19, 2022, entitled NATURAL VOICE UTILITY ASSET ANNOTATION SYSTEM; U.S. Pat. No. 11,397,274, issued Jul. 26, 2022, entitled TRACKED DISTANCE MEASURING DEVICES, SYSTEMS, AND METHODS; U.S. patent application Ser. No. 17/815,387, filed Jul. 27, 2022, entitled INWARD SLOPED DRUM FACE FOR PIPE INSPECTION CAMERA SYSTEM; U.S. Pat. No. 11,404,837, issued Aug. 2, 2022, entitled ROBUST IMPEDANCE CONTROLLED SLIP RINGS; U.S. Pat. No. 11,402,237, issued Aug. 2, 2022, entitled VIDEO PIPE INSPECTION SYSTEMS WITH VIDEO INTEGRATED WITH ADDITIONAL SENSOR DATA; U.S. Provisional Patent Application 63/370,760, filed Aug. 8, 2022, entitled SYSTES AND METHODS FOR INSPECTION ANIMATION; U.S. Pat. No. 11,418,761, issued Aug. 16, 2022, entitled INSPECTION CAMERA DEVICES AND METHODS WITH SELECTIVELY ILLUMINATED MULTISENSOR IMAGING SYSTEMS; U.S. Pat. No. 11,428,814, issued Aug. 30, 2022, entitled OPTICAL GROUND TRACKING APPARATUS, SYSTEMS, AND METHODS FOR USE WITH BURIED UTILTIY LOCATORS; U.S. patent application Ser. No. 17/930,029, filed Sep. 6, 2022, entitled GNSS POSITIONING METHODS AND DEVICES USING PPP-RTK, RTK, SSR, OR LIKE CORRECTION DATA; U.S. Pat. No. 11,448,600, issued Sep. 20, 2022, entitled MULTI-CAMERA PIPE INSPECTION APPARATUS, SYSTEMS, AND METHODS; U.S. patent application Ser. No. 17/935,564, filed Sep. 26, 2022, entitled SYSTEMS AND METHODS FOR DETERMINING AND DISTINGUISHING BURIED OBJECT USING ARTIFICIAL INTELLIGENCE; U.S. Pat. No. 11,460,598, issued Oct. 4, 2022, entitled USER INTERFACES FOR UTILITY LOCATORS; U.S. Pat. No. 11,467,317, issued Oct. 11, 2022, entitled ELECTROMAGNETIC MARKER DEVICES WITH SEPARATE RECEIVE AND TRANSMIT ANTENNA ELEMENTS; U.S. Pat. No. 11,468,610, issued Oct. 11, 2022, entitled METHODS AND SYSTEMS FOR GENERATING INTERACTIVE MAPING DISPLAYS IN CONJUNCTION WITH USER INTERFACE DEVICES; U.S. Pat. No. 11,476,539, issued Oct. 18, 2022, entitled MODULAR BATTERY PACK APPARATUS, SYSTEMS, AND METHODS INCLUDING VIRAL DATA AND/OR CODE TRANSFER; U.S. Pat. No. 11,474,276, issued Oct. 18, 2022, entitled SYSTEMS AND METHODS FOR UTILITY LOCATING IN A MULTI- UTILITY ENVIRONMENT; U.S. Pat. No. 11,476,851, issued Oct. 18, 2022, entitled MAGNETICALLY SENSED USER INTERFCE DEVICES; U.S. Provisional Patent Application 63/380,375, filed Oct. 20, 2022, entitled LINKED CABLE-HANDLING AND CABLE-STORAGE DRUM DEVICES AND SYSTEMS FOR THE COORDINATED MOVEMENT OF A PUSH-CABLE; U.S. Provisional Patent Application 63/435,148, filed Dec. 23, 2022, entitled SYSTEMS, APPARATUS, AND METHODS FOR DOCUMENTING UTILITY POTHOLES AND ASSOCIATED UTILITY LINES; U.S. patent application Ser. No. 18/089,266, filed Dec. 27, 2022, entitled MODULAR BATTERY SYSTEMS INCLUDING INTERCHANGEABLE BATTERY INTERFACE APPARATUS; U.S. patent application Ser. No. 18/162,663, filed Jan. 31, 2023, entitled UTILTY LOCATING SYSTEMS AND METHODS WITH FILTER TUNING FOR POWER GRID FLUCTUATIONS; U.S. Provisional Patent Application 63/485,905, filed Feb. 18, 2023, entitled SYSTEMS AND METHODS FOR INSPECTION ANIMATION; U.S. Provisional Patent Application 63/492,473, filed Mar. 27, 2023, entitled VIDEO INSPECTION AND CAMERA HEAD TRACKING SYSTEMS AND METHODS; U.S. Pat. No. 11,614,613, issued Mar. 28, 2023, entitled DOCKABLE CAMERA REEL AND CCU SYSTEM; U.S. Pat. No. 11,649,917, issued May 16, 2023, entitled INTEGRATED FLEX-SHAFT CAMERA SYSTEM WITH HAND CONTROL; U.S. Pat. No. 11,665,321, issued May 30, 2023, entitled PIPE INSPECTION SYSTEM WITH REPLACEABLE CABLE STORAGE DRUM; and U.S. Pat. No. 11,674,906, issued Jun. 13, 2023, entitled SELF-LEVELING INSPECTION SYSTEMS AND METHODS. The content of each of the above-described patents and applications is incorporated by reference herein in its entirety. The above applications may be collectively denoted herein as the "co-assigned applications" or "incorporated applications."

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

EXAMPLE EMBODIMENTS

Figure 1B:
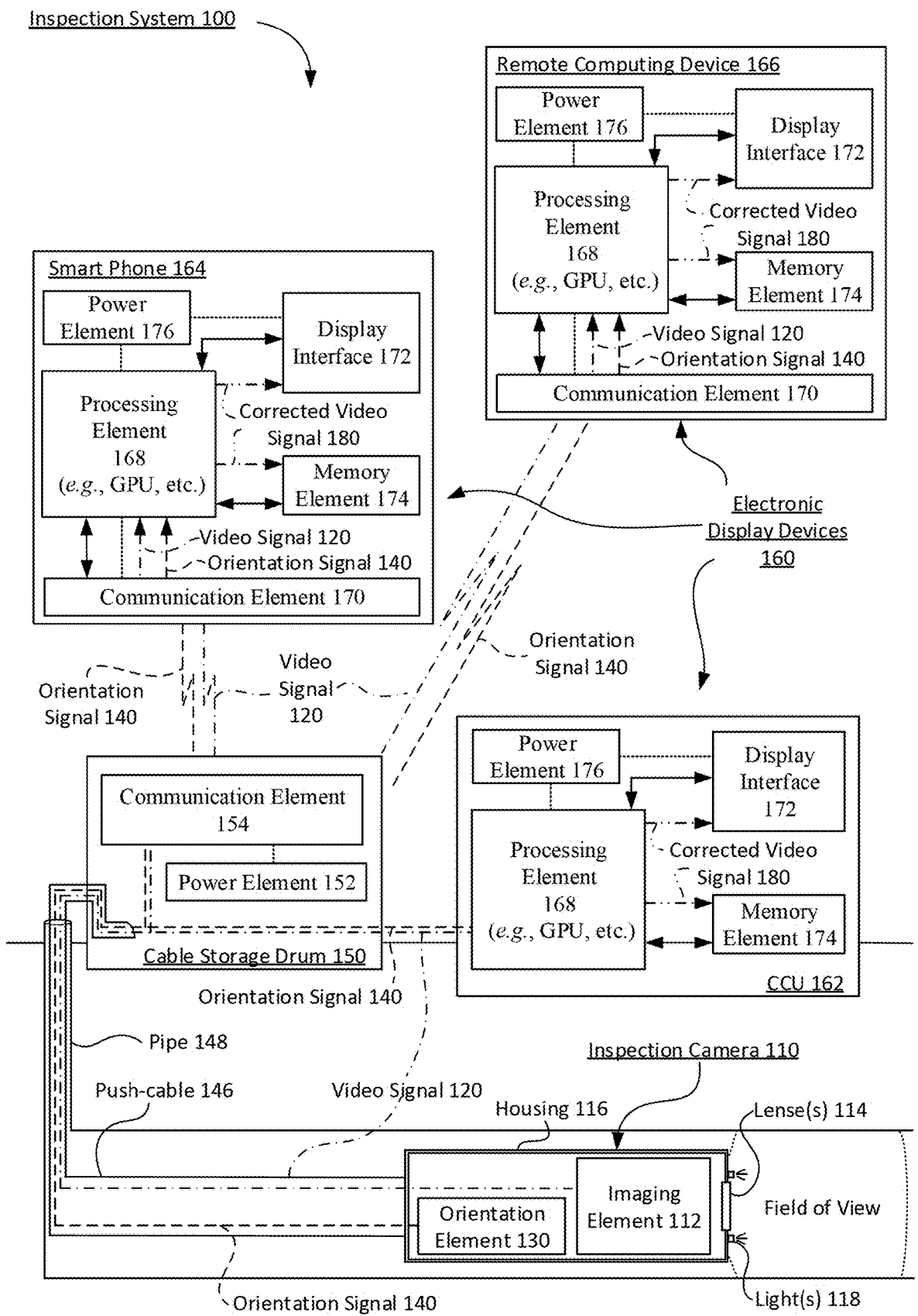
FIG. 1B is a diagram of an embodiment the inspection system from FIG. 1A.

Referring to FIGS. 1A and 1B, an inspection system 100 is illustrated which may include video leveling computer animation transitions in keeping with the present disclosure. The inspection system 100 may include an inspection camera 110 having an imaging element 112 (FIG. 1B) that includes one or more imaging sensors positioned behind one or more lenses 114 and disposed in a housing 116 in generating a video signal 120 (FIG. 1B. One or more lights 118 may illuminate the field of view captured by the inspection camera 110 in generating the video signal 120 (FIG. 1B). The inspection camera 110 may be or share aspects with the cameras disclosed in U.S. Pat. No. 6,831,679, entitled VIDEO CAMERA HEAD WITH THERMAL FEEDBACK LIGHTING CONTROL issued Dec. 14, 2004; U.S. Pat. No. 8,587,648, entitled SELF-LEVELING CAMERA HEAD, issued Nov. 9, 2013; U.S. Pat. No. 9,066,446, entitled THERMAL EXTRACTION ARCHITECTURE FOR CAMERA HEAD, INSPECTION SYSTEMS, AND OTHER DEVICES AND SYSTEMS issued Jun. 23, 2015; U.S. Pat. No. 9,277,105, entitled SELF-LEVELING CAMERA HEADS, issued Mar. 1, 2016; U.S. Pat. No. 9,824,433 entitled PIPE INSPECTION SYSTEM CAMERA HEADS, issued on Nov. 21, 2017; U.S. Pat. No. 9,835,564, entitled MULTI-CAMERA PIPE INSPECTION APPARATUS, SYSTEM, AND METHODS, issued Dec. 5, 2017; U.S. Pat. No. 10,288,997, entitled ROTATING CONTACT ASSEMBLIES FOR SELF-LEVELING CAMERA HEADS, issued May 14, 2019; U.S. Pat. No. 10,715,703, entitled SELF-LEVELING CAMERA HEADS, issued Jul. 14, 2020; U.S. Pat. No. 10,848,655, entitled HEAT EXTRACTION ARCHITECTURE FOR COMPACT VIDEO CAMERA HEADS, issued Nov. 24, 2020; U.S. Pat. No. 11,209,115, entitled PIPE INSPECTION AND/OR MAPPING CAMERA HEADS, SYSTEMS, AND METHODS, issued Dec. 28, 2021; and/or other disclosed in the incorporated patents and applications. The content of each of these applications is incorporated by reference herein in its entirety. The inspection camera 100 may further include an orientation element 130 (FIG. 1B) having one or more orientation sensors (e.g., accelerometers, gyroscopic sensors, or other orientation determining sensors and mechanisms) in generating an orientation signal 140 (FIG. 1B) describing the orientation of an inspection image representing the field of view captured by the inspection camera 110 in the video signal 120 (FIG. 1B) relative to upright, earth normal orientation.

The inspection camera 110 may be disposed on the end of a push-cable 146 dispensed from a cable storage drum 150 allowing the inspection camera 110 to be moved through a pipe 148 or other inspection environment. The push-cable 146 may be configured to communicate the video signals 120 (FIG. 1B) and orientation signals 140 (FIG. 1B) to one or more electronic display devices 160 such as, but not limited to, a camera control unit (CCU) 162, smart phone 164, remote computing device 166, or the like. The push-cable 146 may be or share aspects with those disclosed in U.S. Pat. No. 5,939,679, entitled VIDEO PUSH CABLE, issued Aug. 17, 1999; U.S. patent application Ser. No. 14/970,362, entitled COAXIAL VIDEO PUSH-CABLES FOR USE IN INSPECTION SYSTEMS, filed Dec. 15, 2015; U.S. Pat. No. 9,448,376, entitled HIGH BANDWIDTH PUSH-CABLES FOR VIDEO INSPECTION SYSTEMS, issued Sep. 20, 2016; U.S. Pat. No. 9,468,954, entitled PIPE INSPECTION SYSTEM INCLUDING JETTER PUSH-CABLE, issued Oct. 18, 2016; U.S. Pat. No. 10,764,541, entitled COAXIAL VIDEO PUSH-CABLES FOR USE IN INSPECTION SYSTEMS, issued Sep. 1, 2020; and/or other disclosed in the incorporated patents and applications. The content of each of these applications is incorporated by reference herein in its entirety.

Referring to FIG. 1B, the cable storage drum 150 may include a communication element 152 (e.g., Wi-Fi, Bluetooth, or the like) to wireless communicate the video signals 120 and orientation signals 140 to the smart phone 164, the remote computing device 166, or other or other electronic display devices. Uncorrected video may also be output with metadata describing the orientation instead of using an orientation signal 140. In such cable-storage drum embodiments as the cable storage drum 150, a power element 154 may provide electrical power to the communication element 152 and/or other powered element that may be on or coupled with the cable storage drum 150. The power element 154 may be or include one or more batteries, grid tied power, or the like. In some such embodiments the power element 154 may be or include that may provide electrical power to the communication element 152. The one or more batteries of power element 154 may be or share aspects with those disclosed in U.S. Pat. No. 10,090,498, entitled MODULAR BATTERY PACK APPARATUS, SYSTEMS, AND METHODS INCLUDING VIRAL DATA AND/OR CODE TRANSFER, issued Oct. 2, 2018; U.S. patent application Ser. No. 16/255,524, entitled RECHARGEABLE BATTERY PACK ONBOARD CHARGE STATE INDICATION METHOD AND APPARATUS, filed Jan. 23, 2019; U.S. Pat. No. 11,171,369, entitled MODULAR BATTERY PACK APPARATUS, SYSTEMS, AND METHODS, issued Nov. 9, 2021; and/or other disclosed in the incorporated patents and applications. The content of each of these applications is incorporated by reference herein in its entirety. The communication element 152 may be or share aspects with the devices disclosed in U.S. patent application Ser. No. 17/528,956, entitled VIDEO INSPECTION SYSTEM APPARATUS AND RELAY MODULES AND CONNECTION PORTS, filed Nov. 17, 2021 and/or others disclosed in the incorporated patents and applications. The content of each of these applications is incorporated by reference herein in its entirety. Further, the cable storage drum 150 may be or share aspects with those disclosed in U.S. Pat. No. 6,958,767, entitled VIDEO PIPE INSPECTION SYSTEM EMPLOYING NON-ROTATING CABLE STORAGE DRUM, issued Oct. 25, 2005; U.S. Pat. No. 8,908,027, entitled ASYMMETRIC DRAG FORCE BEARING FOR USE IN PUSH-CABLE STORAGE DRUM, issued Dec. 9, 2014; U.S. Pat. No. 10,009,582, entitled PIPE INSPECTION SYSTEM WITH REPLACEABLE CABLE STORAGE DRUM, issued Jun. 26, 2018; U.S. Pat. No. 10,084,945, entitled CABLE STORAGE DRUM WITH MOVEABLE CCU DOCKING APPARATUS, issued Sep. 25, 2018; U.S. patent application Ser. No. 16/588,834, entitled VIDEO INSPECTION SYSTEM WITH WIRELESS CABLE STORAGE DRUM, issued Sep. 30, 2019; U.S. patent application Ser. No. 17/110,273, entitled INTEGRAL DUAL CLEANER CAMERA DRUM SYSTEMS AND METHODS, filed Dec. 2, 2020; U.S. Provisional Patent Application 63/227,974, entitled INWARD SLOPED DRUM FACE FOR DRUM INSPECTION CAMERA SYSTEMS, filed Jul. 30, 2021; and/or others disclosed in the incorporated patents and applications. The content of each of these applications is incorporated by reference herein in its entirety. The CCU 162 may be or share aspects with those disclosed in U.S. Pat. No. 10,084, 945, entitled CABLE STORAGE DRUM WITH MOVEABLE CCU DOCKING APPARATUS, issued Sep. 25, 2018; U.S. patent application Ser. No. 17/190,400, filed Mar. 3, 2021, entitled DOCKABLE CAMERA REEL AND CCU SYSTEM; and/or other disclosed in the incorporated patents and applications. The content of each of these applications is incorporated by reference herein in its entirety.

Still referring to FIG. 1B, each of the electronic display devices 160 (e.g., the CCU 162, smart phone 164 remote computing device 166, and the like) may include a processing element 168 having one or more processors receiving the video signals 120 and orientation signals 140 from the inspection camera 110 via a wired connection or the communication element 152 of the cable storage drum 150 (e.g., communicating with another communication element 170 disposed in the smart phone 164 or remote computing device 166 or the like). The processing element 168 may be configured to determine and output a corrected video signal 180 having a corrected, upright, earth normal oriented video that includes one or more video leveling computer animation transitions (e.g., using the method 300 of FIG. 3, the method 400 of FIG. 4A, the method 450 of FIG. 4B, the method 630 of FIG. 6B, the method 730 of FIG. 7B, the method 800 of FIG. 8, or the method 1200 of FIG. 12). In some embodiments the processing element 170 (FIG. 1B) may be or include one or more GPUs or the like processors. Further, in some embodiments, such a processing element as the processing element 170 may be disposed in a different computing device and the processing of data may fully or partially be carried out in the different computing device (e.g., the remote computing device 166 which may be a cloud computing device or the like). The output corrected video signal 180 may be communicated to an interface display 172 for displaying the upright, earth normalized inspection video, video leveling computer animation transitions, and optional additional data relating to the inspection and/or inspection system devices. In some embodiments, the inspection image rotations associated with the corrected video signal may be generated from a single inspection image from the video signal captured at a single point in time and space in the inspection video. In other method embodiments, the inspection image rotations associated with the corrected video signal may be generated from a plurality of inspection images from the video signal captured at successive points in time and space. Each of the display devices 160 (e.g., the CCU 162, smart phone 164, remote computing device 166, and others that may not be illustrated) may also include a memory element 174 having one or more non-transitory memories in storing instructions related to generating a corrected video signal including one or more video leveling computer animation transitions and the resulting corrected video signal including one or more video leveling computer animation transitions.

The inspection images generated by a camera in an inspection system in keeping with the present disclosure, such as the system 100 of FIGS. 1A and 1B, may generate one or more orientation correction in ninety degree increments to reorient inspection images to best realign with the upright, earth normal orientation. So as to not disorient a user, each orientation corrections may include a video leveling computer animation transition (also referred to herein as "computer animation transition") animating the change in orientation.

Figure 2A:
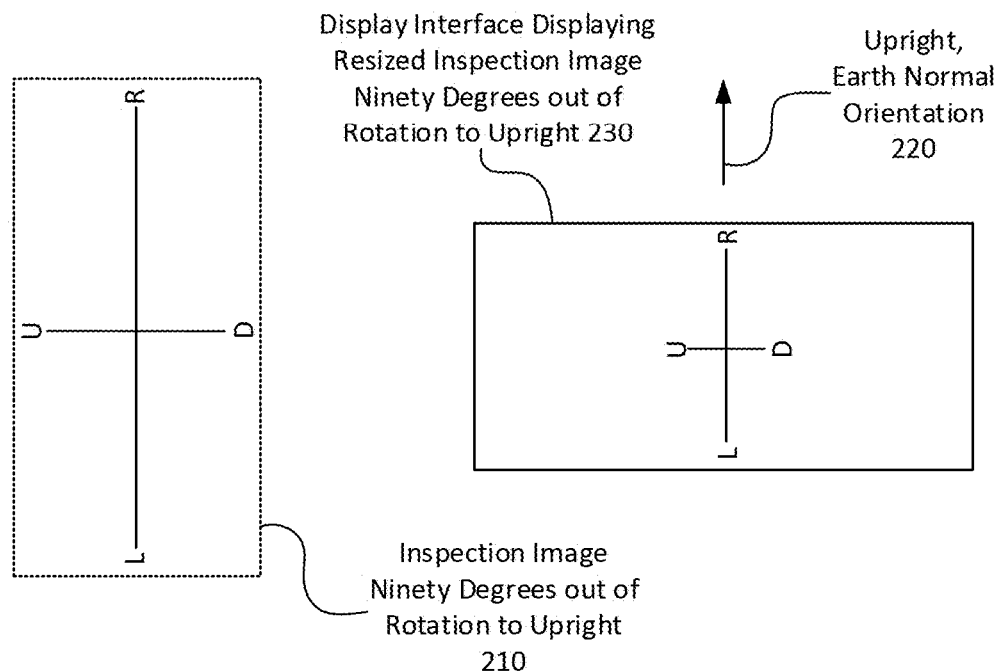
FIG. 2A is an illustration of an embodiment of an inspection image relative to upright, earth normal orientation.

Turning to FIG. 2A, an inspection image ninety degrees out of rotation to upright 210 relative to an upright, earth normal orientation 220 is illustrated. Prior to any rotation correction, such an inspection image may be rendered on a display interface displaying the resized inspection video image ninety degrees out of rotation to upright 230 allowing it to be viewed by a user. As the inspection image ninety degrees out of rotation to upright 210 would be inconvenient for a user to view in such a scenario as that rendered on the display interface displaying the resized inspection video image ninety degrees out of rotation to upright 230, a rotation correction that includes a video leveling computer animation transition to facilitate ease of viewing for the user.

Figure 2B:
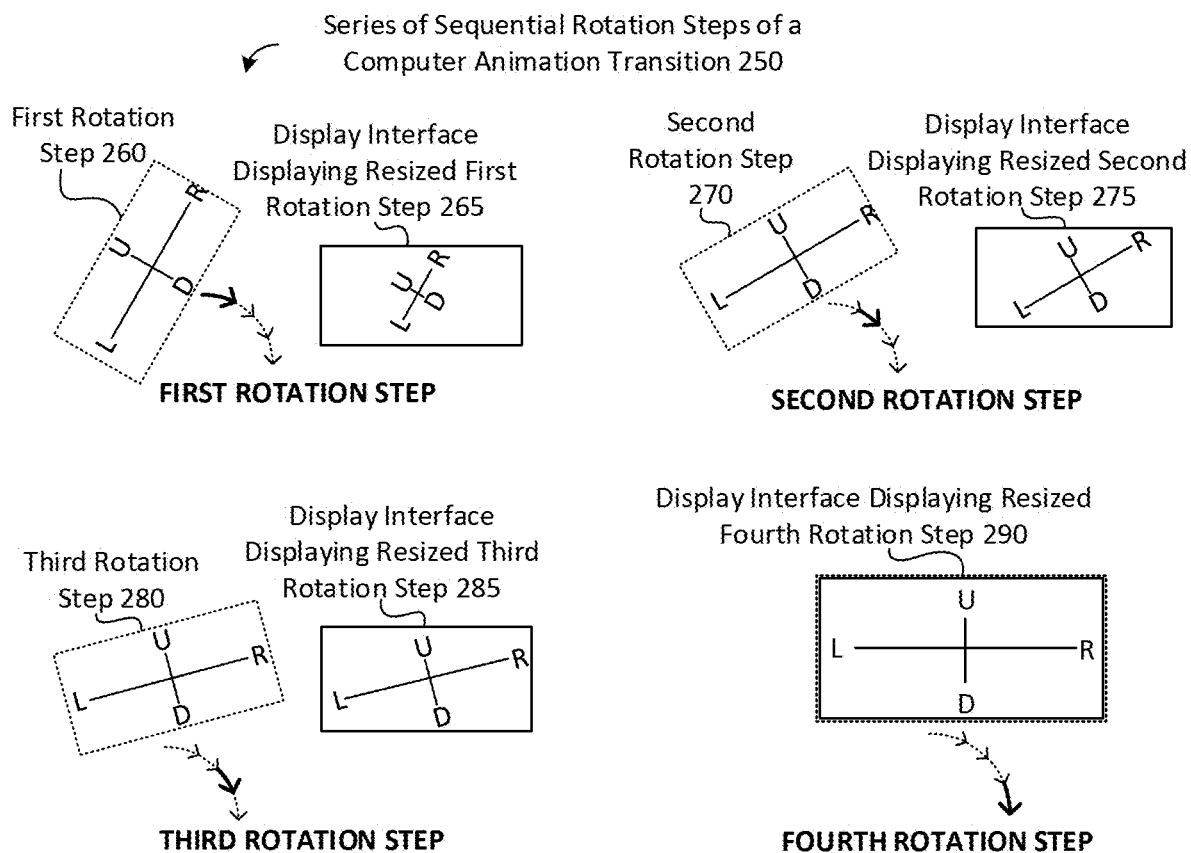
FIG. 2B is an illustration of an embodiment of a series of sequential rotation steps of a video leveling computer animation transition.

Turning to FIG. 2B, a series of sequential rotation steps of a computer animation transition 250 are illustrated. In such a computer animation transition, the inspection image may rotate incrementally from a first rotation step 260 to a second rotation step 270 and further onto a third rotation step 280 and finally onto a fourth rotation step 290. At each rotation step 260, 270, 280, and 290 the inspection image may be resized (e.g., cropped, reduced in size, stretched, or otherwise resized) to fit the shape of a display interface. The series of sequential rotation steps of a computer animation transition 250 are illustrated in FIG. 2B as having four steps (e.g., the first rotation step 260, the second rotation step 270, the third rotation step 280, and the fourth rotation step 290), in other embodiments a rotation correction may be divided into any number sequential rotation steps for use in the computer animation transition. For instance, in some embodiments, a computer animation transition of the present invention animating a rotation correction may include one or more sequential rotation steps based on the refresh rate of the electronic display device or the inspection camera (e.g., one sequential rotation step for every refresh instance or the like).

Still referring to FIG. 2B, in some embodiments each sequential rotation step may rotate may use the same inspection image (e.g., the first rotation step 260, the second rotation step 270, the third rotation step 280, and the fourth rotation step 290 may all rotate the same inspection image). In other embodiments, the sequential rotation steps may use different sequential inspection images. For instance, the first rotation step 260 may use a first inspection image from a first place in time and space, the second rotation step 270 may use a second inspection image from a second place in time and space, the third rotation step 280 may use a third inspection image from a third place in time and space, and the fourth rotation step 290 may use a fourth inspection image from a fourth place in time and space. In some such embodiments, the inspection image at each rotation step may be the current inspection image generated by the inspection camera.

Figure 3:
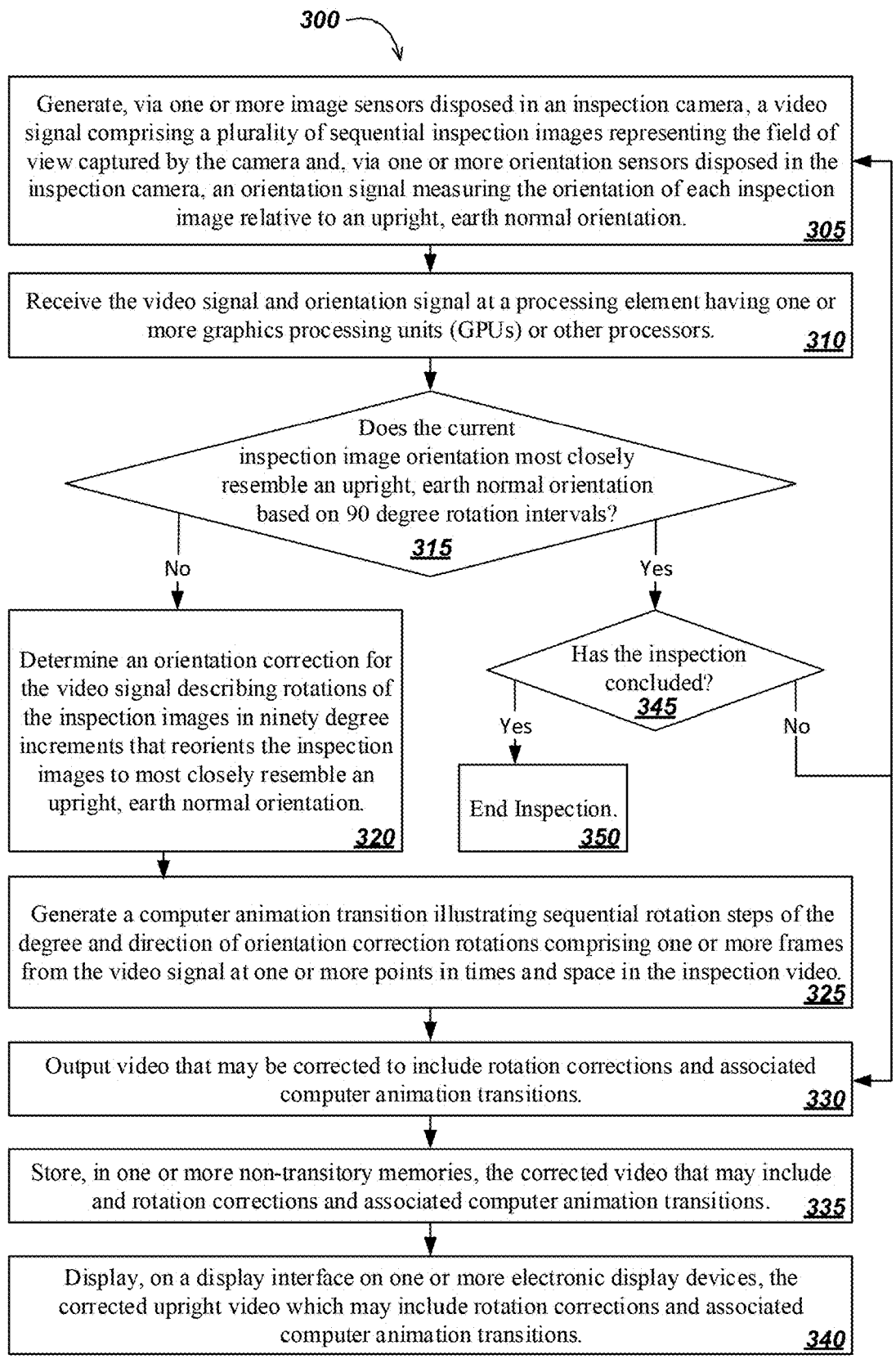
FIG. 3 is an embodiment of a method for rotation corrections that includes video leveling computer animation transitions.

Turning to FIG. 3, a method 300 for rotation corrections in ninety degree increments (e.g., ninety or one hundred eighty degree rotation corrections) that include video leveling computer animation transitions is disclosed. In step 305, the method 300 may include generating, via one or more image sensors disposed in an inspection camera (e.g., imaging element 112 of the inspection camera 110 of FIG. 1B), a video signal comprising a plurality of sequential inspection images representing the field of view captured by the camera and, via one or more orientation sensors disposed in the inspection camera (e.g., imaging element 112 of the inspection camera 110 of FIG. 1B), an orientation signal measuring the orientation of each inspection image relative to an upright, earth normal orientation in inspection images of the video signal. In a step 310, the method 300 may include receiving the video signal and orientation signal at a processing element having one or more graphics processing units (GPUs) or other processors (e.g., processing element 168 of FIG. 1B). In decision step 315, the method 300 may determine whether the inspection image most closely resembles an upright, earth normal orientation. In other words, the method 300 may determine in decision step 315 whether a rotation correction would better reorient the inspection image to an upright, earth normal orientation. If the inspection image does not most closely resembles an upright, earth normal orientation in step 315, the method 300 may continue onto step 320. In step 320, an orientation correction for the video signal describing rotations of the video signal images in ninety degree increments that reorients the images to most closely resemble an upright, earth normal orientation may be determined. Onto step 325, the method 300 may include generating a computer animation transition animating sequential steps of the degree and direction of orientation correction rotations comprising one or more inspection images from the video signal at one or more points in times and space in the inspection video. Such a computer animation transition may be generated via the method 400 of FIG. 4A or the method 450 of FIG. 4B. In step 330, the method 300 may include outputting video that may be corrected to include computer animation transitions and rotation corrections. In another step 335, the method 300 may include storing, in one or more non-transitory memories, the corrected video that may include computer animation transitions and rotation corrections. In a step 340, the method 300 may include displaying, on a display interface on one or more electronic display devices, the corrected upright video which may include rotation corrections and associated computer animation transitions.

Returning to step 315, if the inspection image does most closely resembles an upright, earth normal orientation, the method 300 may continue onto the decision step 345. In decision step 345, it may be determined if the inspection has concluded. If the inspection has concluded, the method may continue onto step 350 where the inspection will end. If the inspection has not concluded, the method may cycle back to step 305 where inspection images of video inspection and orientation signal will continue to be generated and onto step 330 outputting the corrected video signal.

Figure 4A:
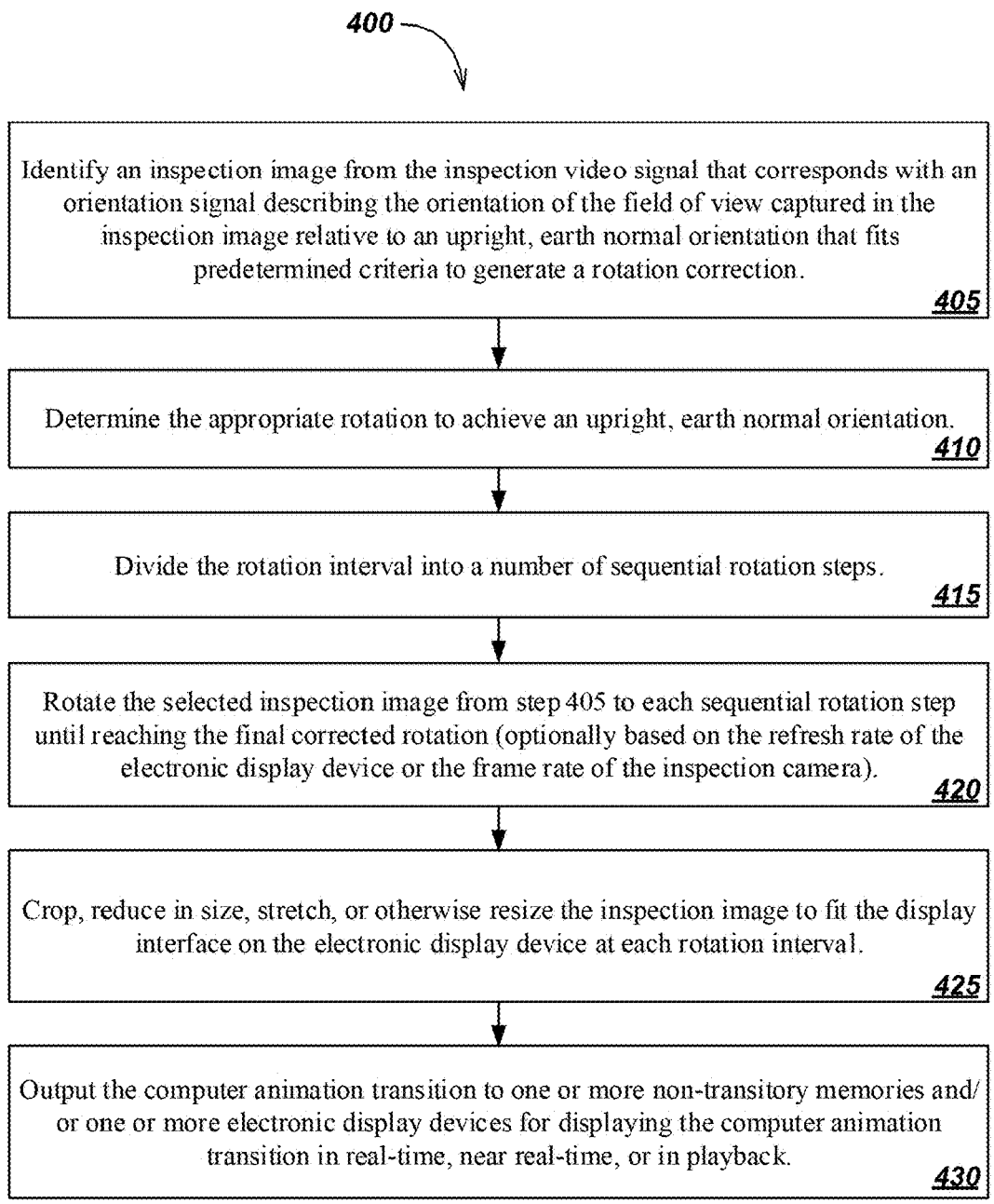
FIG. 4A is a method for generating video leveling computer animation transitions from a single inspection image.

Turning to FIG. 4A, a method 400 for generating a video leveling computer animation transition via a single inspection image is disclosed. In method 400, step 405 may include identifying an inspection image from the inspection video signal that corresponds with an orientation signal describing the orientation of the field of view captured in the inspection image relative to an upright, earth normal orientation that fits predetermined criteria to generate a rotation correction. In step 410, the method 400 may include determining the appropriate rotation to achieve an upright, earth normal orientation. In step 415, the method 400 may include dividing the rotation interval (e.g., a ninety or one hundred eighty degree rotation interval) into a number of sequential rotation steps. In step 420, the method 400 may include selecting inspection image from step 405 may be rotated to each sequential rotation step until reaching the final corrected rotation (optionally based on the refresh rate of the electronic display device or the frame rate of the inspection camera). In step 425, the method 400 may include cropping, reducing in size, stretching, or otherwise resizing the inspection image to fit the display interface on the electronic display device at each rotation interval. In step 430, the method 400 may include outputting the computer animation transition to one or more non-transitory memories and/or one or more electronic display devices for displaying the computer animation transition in real-time, near real-time, or in playback.

Figure 4B:
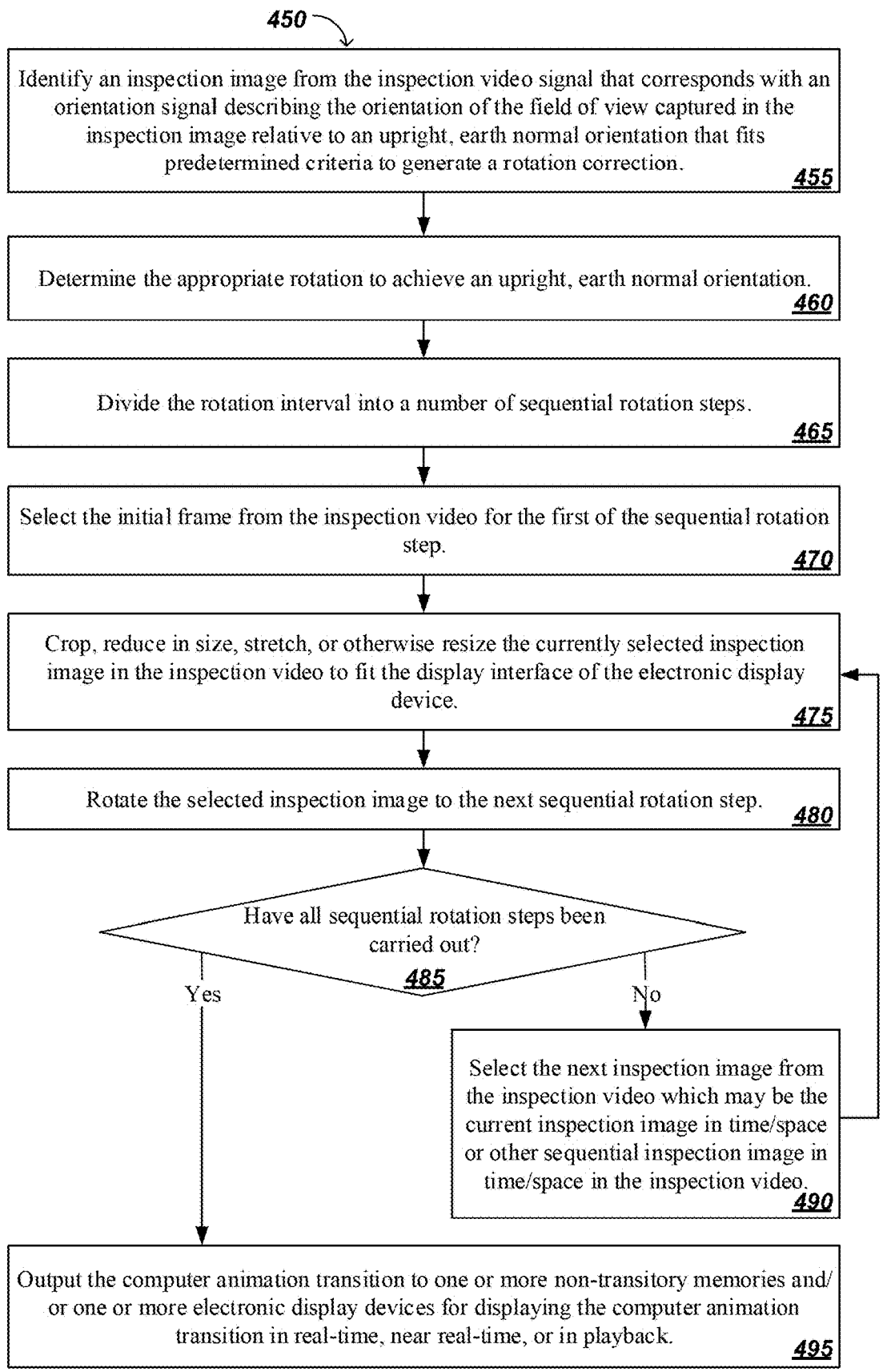
FIG. 4B is an embodiment of a method for generating video leveling computer animation transitions from multiple inspection image from different points in time and space in the inspection.

Turning to FIG. 4B, a method 450 for generating a video leveling computer animation transition via multiple successive inspection images is disclosed. In method 450, step 455 may include generating an inspection image from the inspection video signal that corresponds with an orientation signal describing the orientation of the field of view captured in the inspection image relative to an upright, earth normal orientation that fits predetermined criteria to generate a rotation correction. In step 460, the method 450 may include determining the appropriate rotation to achieve an upright, earth normal orientation. In step 465, the method 450 may include determining the rotation interval into a number of sequential rotation steps. In step 470, the method 450 may include selecting the initial inspection image from the inspection video for the first of the sequential rotation step. In step 475, the method 450 may include cropping, reducing in size, stretching, or otherwise resizing the inspection image of the inspection video to fit the display interface of the electronic display device. In step 480, the method 450 may include rotating the selected inspection image to the next sequential rotation step. In a decision step 485, the method 450 may determine if all sequential rotation steps been carried out. If all sequential rotation steps have not been carried out in step 485, the method 450 may continue onto a step 490 where the method 450 may include selecting the next inspection image from the inspection video which may be the current inspection image in time/space or other sequential inspection image in time/space in the inspection video. The method 450 may then repeat back at step 475.

Returning back to step 485, if all sequential rotation steps been carried out in step 485, the method 450 may continue onto a step 495. In a step 495, the method 450 may include outputting the computer animation transition including the rotation correction to one or more non-transitory memories and/or one or more electronic display devices for displaying the computer animation transition in real-time, near real-time, or in playback.

In some system and method embodiments disclosed herein, the rotations of inspection images may occur via rendering the inspection images onto a graphics library (GL) surface and the GL surface may be rotated in ninety degree increments. Such a GL surface may be or may be made to be square in shape in some embodiments. For instance, an inspection video may be applied as a texture to a square GL surface thus the output corrected video signal may be accessible for viewing on various different electronic display devices having a shared graphics library without relying upon a field-programmable gate array (FPGA) or like circuit dedicated for rotations based on specific applications and associated hardware as known in the art. As illustrated further herein, the GL surface may have other shapes (e.g., the pipe-shaped GL surface of FIGS. 9A and 9B, the regular polygon shaped GL surfaces of FIGS. 10A, 10B, 11, and 12, or other shapes that have not been illustrated). Likewise, it should be noted that orientation corrections and associated computer animation transitions may be achieved in processing using techniques other than through the use of a GL surface. The use of GL surfaces described herein are provided to exemplify a technique by which orientation corrections and associated computer animation transitions in inspection systems may be achieved. Other techniques may be included in systems and methods in keeping with the present disclosure. Instead of utilizing a graphics library such as those publically available through OpenGL, WebGL, CUDA, or the like, one knowledge in the art may, for instance, utilize non-GPU processing (e.g., a CPU processing or the like), programmable logic (e.g., an FPGA or the like), specialty designed hardware (e.g., an ASIC or the like), or other techniques, methods, and hardware in generating rotations of inspection images and associated computer animation transitions.

Figure 5A:
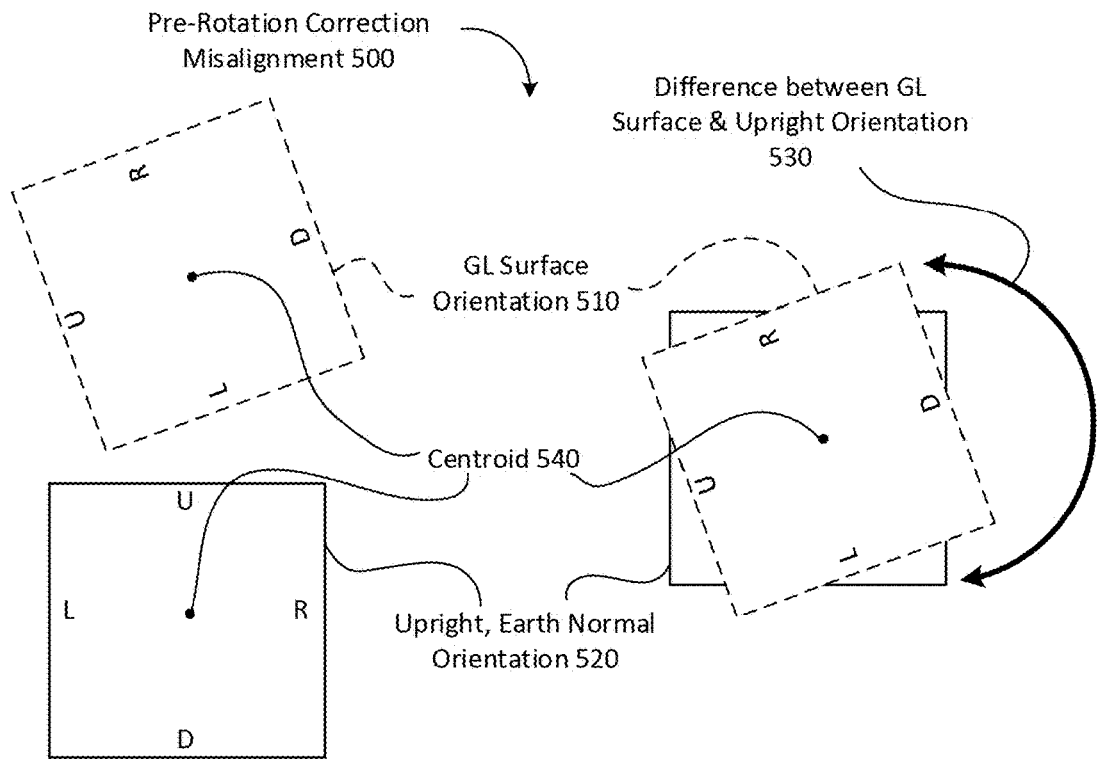
FIG. 5A is an illustration of an embodiment of misalignment between a pre-rotation GL surface as compared to the upright, earth normal orientation.

Turning to FIG. 5A, a pre-rotation misalignment 500 is illustrated between a square GL surface orientation 510 capturing the field of view of the inspection video generated by an inspection camera (e.g., the inspection camera 110 of FIGS. 1A and 1B) and an upright, earth normal orientation 520. Where a difference between the GL surface and upright orientation 530 is beyond a predetermined threshold, greater than forty-five degrees for instance, a rotation of the inspection image may occur in ninety degree increments about a centroid 540 to best align the field of view captured in the GL surface orientation 510 to best align with the upright, earth normal orientation 520. Such rotations of a GL surface may occur in either clockwise or counterclockwise directions and may occur in any increment multiple of ninety degrees (e.g., ninety degrees, one hundred eighty degrees, or two hundred seventy degrees).

Figure 5B:
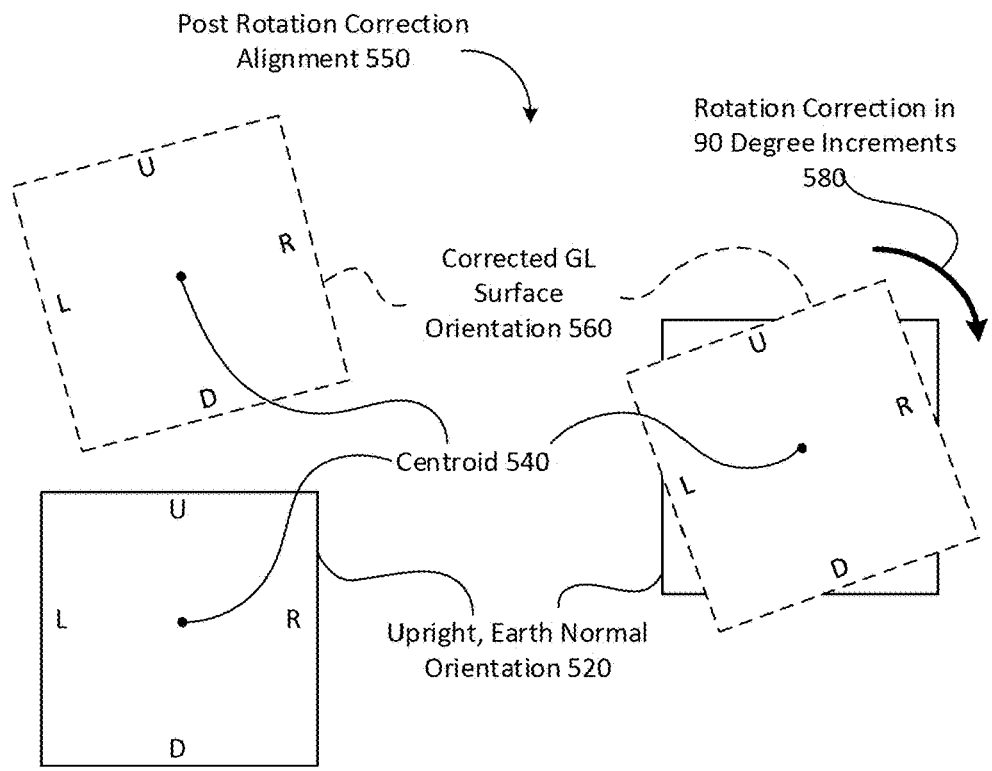
FIG. 5B is an illustration of an embodiment of the post-rotation alignment between the GL surface from FIG. 5A and the upright, earth normal orientation.

Turning to FIG. 5B, a post rotation alignment 550 between a corrected GL surface orientation 560, having experienced one or more rotations in ninety degree increments 580, and the upright, earth normal orientation 520 is illustrated. As shown, the corrected GL surface orientation 560 and the upright, earth normal orientation 520 may align to a much greater degree versus the pre-rotation misalignment 500 illustrated in FIG. 5A. It should be noted that though the corrected GL surface orientation 560 and the upright, earth normal orientation 520 may align to a much greater degree in the post rotation alignment 550 of FIG. 5B, the alignment may not be exact. Instead, rotating the GL surface having the field of view captured in an inspection image by an inspection camera at ninety degree increments represents a low cost and robust approach to achieve a degree of video leveling that would be useful to an observer of an inspection video. In using such an approach to video leveling, an observer may be provided a computer animated transition where such video leveling events occur in a corrected inspection video that is generated in real-time, near real-time, or generated in post processing.

Figure 6A:
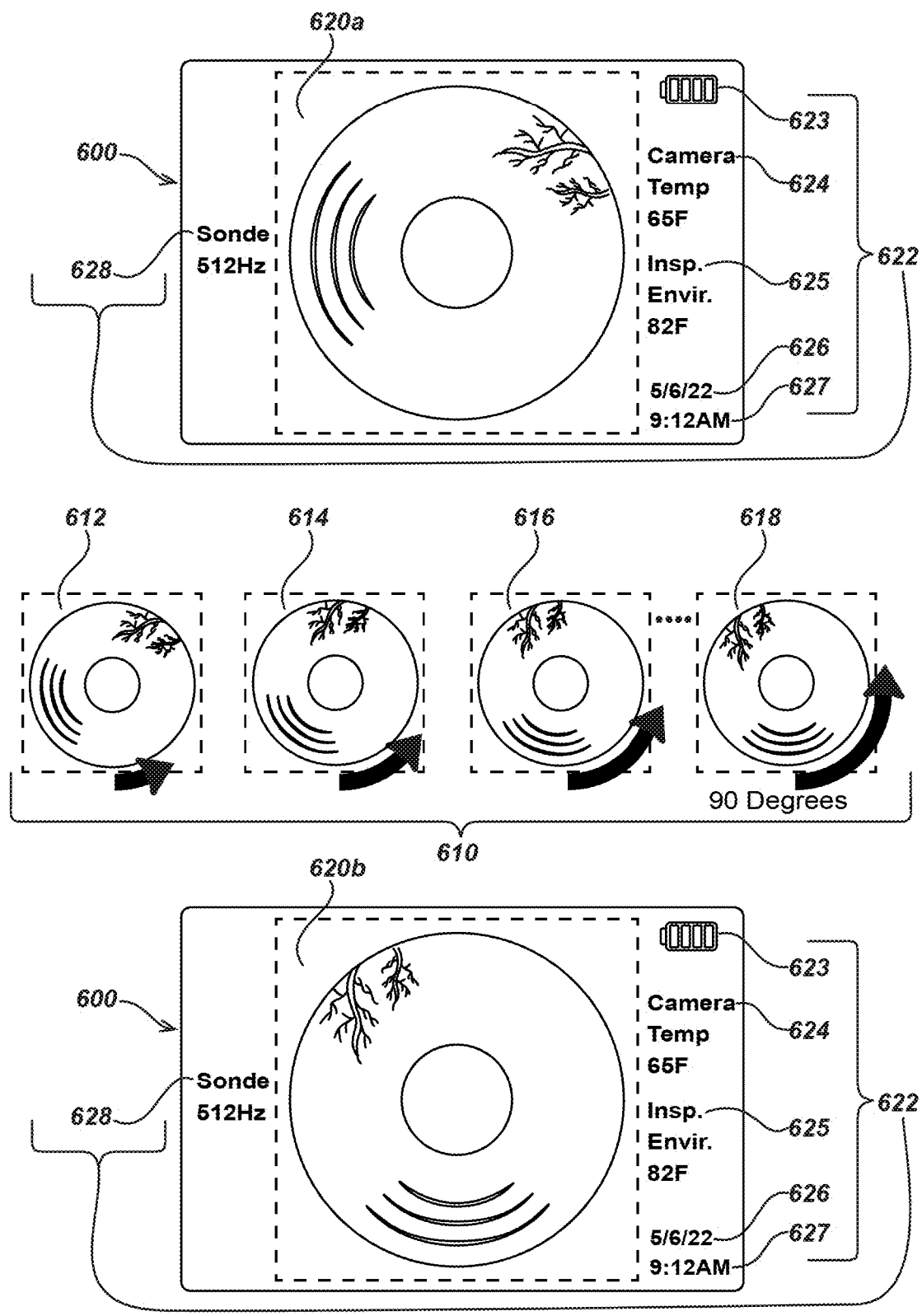
FIG. 6A is an illustration of an embodiment of a display interface demonstrating a computer animation transition from a single inspection captured at one point in time in the inspection video.

Turning to FIG. 6A, a display interface 600 is illustrated demonstrating a computer animation transition 610 in applying a rotation correction in keeping with the present disclosure. As illustrated, a pre-rotation GL surface 620a may include a visual rendering of an inspection video (e.g., via a video signal generated by an inspection camera such as the video signal 120 of FIG. 1B generated by the inspection camera 110 of FIGS. 1A and 1B). Further, in some embodiments, the display interface, such as display interface 600, may be configured to display additional information 322 outside the GL surface such as the pre-rotation GL surface 620a. For instance, the additional information 322 may include but is not limited to a battery status indicator 623 of the electronic display device or other system devices, an internal inspection camera temperature status 624, an external inspection environment temperature 625, a date of inspection 626, a time of inspection 627, a Sonde indicator 628 to notate one or more pipe Sondes associated with the inspection system, and/or the like.

Still referring to FIG. 3A, the computer animation transition 610 may include a number of sequential rotation steps (e.g., a first sequential rotation step 612, a second sequential rotation step 614, and a third sequential rotation step 616 through to an nth sequential rotation step 618). As shown, the sequential rotation steps 612, 614, 616, and 618 of the computer animation transition 610 may rotate independently of the additional information 622 along the periphery of the display interface 600. It should be noted that at each of the sequential rotation steps (e.g., the first sequential rotation step 612, the second sequential rotation step 614, and the third sequential rotation step 616 through to the nth sequential rotation step 618), the inspection image from the inspection video may optionally be cropped, reduced in size, stretched, or otherwise resized to fit the shape of the GL surface at each rotation interval. For instance, a 640×480 video image may be resized to become 640×640 or 480×480. The computer animation transition 610, as well as other computer animation transition embodiments in keeping with the present disclosure, may include any number of rotation steps. For instance, in some embodiments, a computer animation transition of a rotation correction may include one or more sequential rotation steps based on refresh rate of the electronic display device (e.g., one sequential rotation step for every refresh instance or the like). In the computer animation transition 610, each rotation step (e.g., a first sequential rotation step 612, a second sequential rotation step 614, and a third sequential rotation step 616 through to an nth sequential rotation step 618) may be from a single inspection image captured in the inspection video at a single point in time and space until reaching the corrected rotation GL surface 620b orientation. In other embodiments, rotation steps may be from multiple inspection images captured in the inspection video from different points in time and/or space.

Turning to FIG. 6B, a method 630 for generating a computer animation transition that includes a rotation correction is disclosed. In step 635 the method 630 may include identifying and rendering on the GL surface an inspection image from the inspection video signal that corresponds with an orientation signal describing the orientation of the inspection image relative to an upright, earth normal orientation that fits predetermined criteria to generate a rotation correction. For instance, the inspection video may be applied as a texture to a GL surface having a square, regular polygon, three dimensional pipe shape, or other shape. Such predetermined criteria for rotation may, for instance, be any orientation measurement half of a rotation interval as compared to the upright, earth normal orientation (e.g., anything greater than a forty five degree offset from the upright, earth normal orientation in embodiments having a square GL surface). In step 640, the method 630 may determine the appropriate rotation to achieve an upright, earth normal orientation. For instance, such a rotation may be a ninety degree, one hundred eighty degree, or two hundred seventy rotation where a GL surface mapped on the processing element onto which the video signal images are rendered is or may be made to be square in shape. Likewise, other intervals of rotation may occur in some embodiments (e.g., the rotation intervals described in conjunction with regular polygons of FIGS. 10A, 10B, 11, and 12). In step 645 the method 630 may include dividing the rotation interval into a number of sequential rotation steps. Optionally, the step 645 may be carried out based on refresh rate of the electronic display device (e.g., one sequential rotation step for every refresh instance of the electronic display device or every few refresh instances or the like) or the frame rate of the inspection camera (e.g., one sequential rotation step for every subsequent inspection image or every few subsequent inspection images or the like). In step 650, the GL surface containing the selected inspection image from step 635 may be rotated to each sequential rotation step until reaching the final corrected rotation. Further, the step 650 may optionally include cropping, reducing in size, stretching, or otherwise resizing the inspection image to fit the shape of the GL surface at each sequential rotation step. Where the GL surface is square, for instance, a 640×480 video image may be resized to become 640×640 or 480×480. In step 655 the computer animation transition may be output to one or more non-transitory memories and/or one or more electronic display devices for displaying the computer animation transition in real-time, near real-time, or in playback.

Figure 7A:
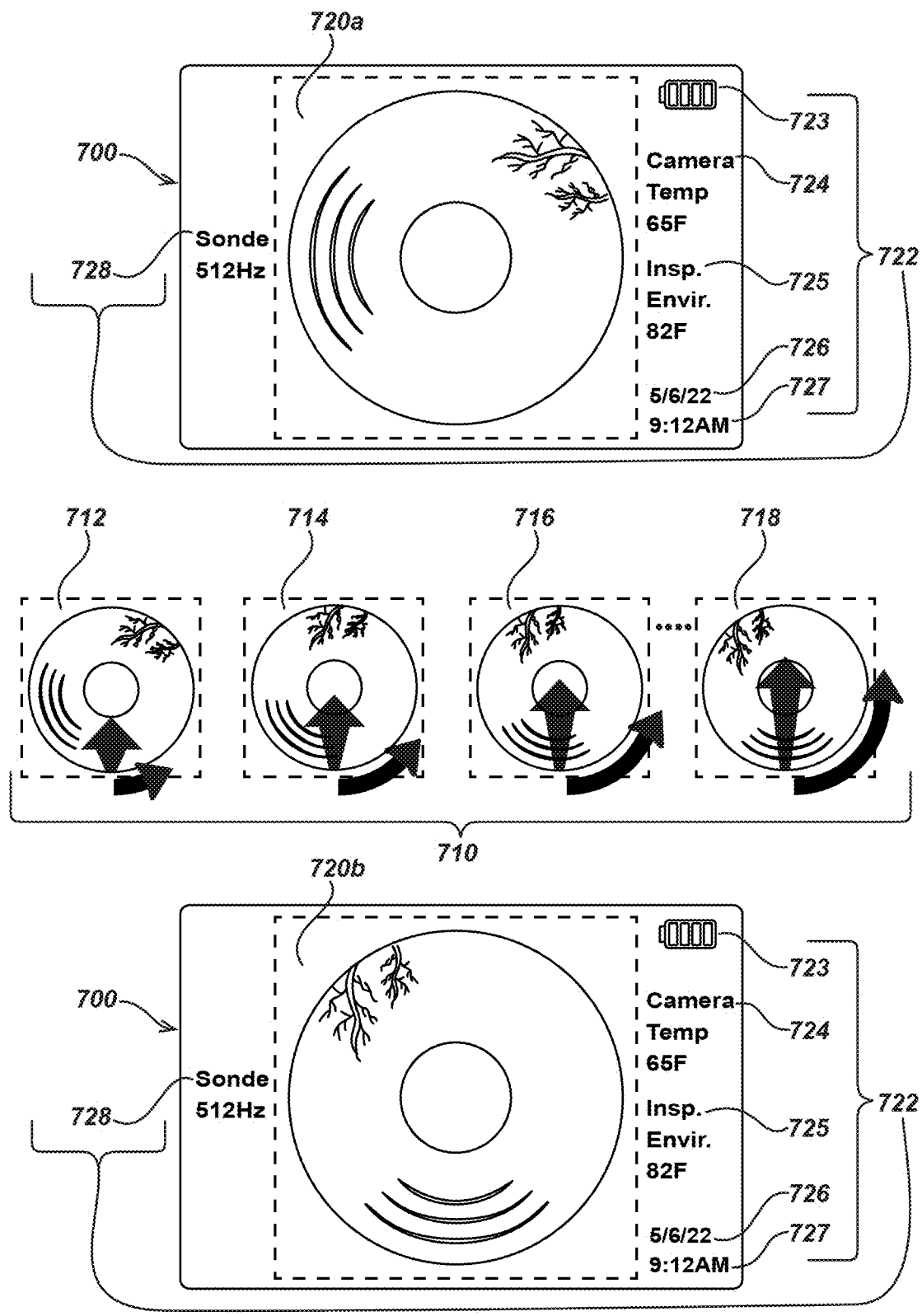
FIG. 7A is an illustration of an embodiment of a display interface demonstrating a computer animation transition from multiple inspection images generated at multiple points in time and space in the inspection video.

Turning to FIG. 7A, a display interface 700 is illustrated demonstrating a computer animation transition 710 in applying a rotation correction in keeping with the present disclosure. As illustrated, a pre-rotation GL surface 720a may include a visual rendering of an inspection video (e.g., via a video signal generated by an inspection camera such as the video signal 120 of FIG. 1B generated by the inspection camera 110 of FIGS. 1A and 1B). Further, in some embodiments, the display interface, such as display interface 700, may be configured to display additional information 722 outside the GL surface such as the pre-rotation GL surface 720a. For instance, the additional information 722 may include but is not limited to a battery status indicator 723 of the electronic display device or other system devices, an internal inspection camera temperature status 724, an external inspection environment temperature 725, a date of inspection 726, a time of inspection 727, a Sonde indicator 728 to notate one or more pipe Sondes associated with the inspection system, and/or the like.

Still referring to FIG. 4A, the computer animation transition 710 may include a number of sequential rotation steps (e.g., a first sequential rotation step 712, a second sequential rotation step 714, and a third sequential rotation step 416 through to an nth sequential rotation step 718). It should be noted that at each of the sequential rotation steps (e.g., a first sequential rotation step 712, a second sequential rotation step 714, and a third sequential rotation step 716 through to an nth sequential rotation step 718), the inspection image may be from a different point in time/space in the video signal than that used in the other sequential rotation steps (e.g., a first sequential rotation step 712, a second sequential rotation step 714, and a third sequential rotation step 716 through to an nth sequential rotation step 718). As shown, the sequential rotation steps 712, 714, 716, and 718 of the computer animation transition 710 may rotate independently of the additional information 722 along the periphery of the display interface 700. It should be noted that at each of the sequential rotation steps (e.g., the first sequential rotation step 712, the second sequential rotation step 714, and the third sequential rotation step 716 through to the nth sequential rotation step 718), the inspection image may optionally be cropped, reduced in size, stretched, or otherwise resized to fit the shape of the GL surface at each rotation interval. The computer animation transition 710, as well as other video leveling computer animation transition embodiments in keeping with the present disclosure, may include any number of rotation steps. In the computer animation transition 710, each sequential rotation step (e.g., a first sequential rotation step 712, a second sequential rotation step 714, and a third sequential rotation step 716 through to an nth sequential rotation step 718) may be from a different inspection images that may be captured in the inspection video at multiple locations in time and space until reaching the corrected rotation GL surface 720b orientation. For instance, each rotation step (e.g., a first sequential rotation step 712, a second sequential rotation step 714, and a third sequential rotation step 716 through to an nth sequential rotation step 718) may be subsequent inspection images or a sequence from every other or every few inspection images from the inspection video captured at different times and location of the inspection video.

Figure 7B:
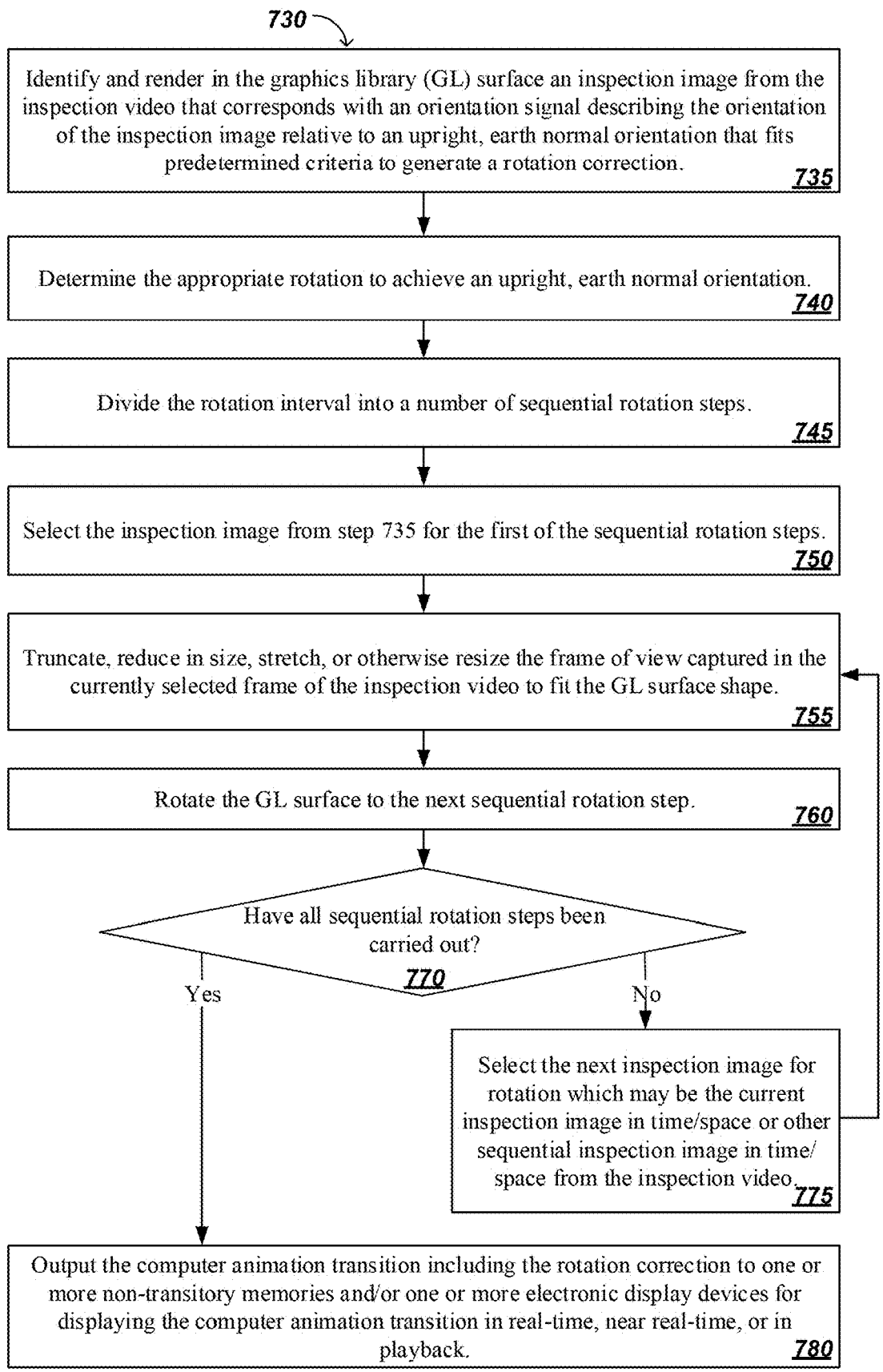
FIG. 7B is an embodiment of a method for generating a computer animation transition from multiple inspection images generated at multiple points in time and space in the inspection video.

Turning to FIG. 7B, another method 730 for generating a computer animation transition that includes a rotation correction is disclosed. In step 735 the method 730 may begin with identifying and rendering on a GL surface an inspection image from the inspection video signal that corresponds with an orientation signal describing the of the inspection image relative to an upright, earth normal orientation that fits predetermined criteria to generate a rotation correction. For instance, the inspection video may be applied as a texture to a GL surface having a square, regular polygon, three dimensional pipe shape, or other shape. Such predetermined criteria for rotation may, for instance, be any orientation measurement half of a rotation interval as compared to the upright, earth normal orientation (e.g., anything greater than a forty five degree offset from the upright, earth normal orientation in embodiments having a square GL surface. In step 740, the method 730 may include determine the appropriate rotation to achieve an upright, earth normal orientation. For instance, such a rotation may be a ninety degree, one hundred eighty degree, or two hundred seventy rotation where a GL surface is or may be made to be square in shape. Likewise, other intervals of rotation may occur in some embodiments (e.g., the rotation intervals described in conjunction with regular polygons of FIGS. 10A, 10B, 11, and 12). In step 745 the method 730 may include dividing the rotation interval into a number of sequential rotation steps. In some embodiments, such sequential rotation steps may be based on the refresh rate of the electronic display device or the frame rate of the inspection camera. In a step 750, the initial inspection image from step 735 may be selected for the first of the sequential rotation steps. In a step 755, the currently selected inspection image may be cropped, reduced in size, stretched, or otherwise resized to fit the GL surface shape. Where the GL surface is square, for instance, a 640×480 video image may be resized to become 640×640 or 480×480. In a step 760, the GL surface may be rotated to the next sequential rotation step. For instance, an inspection video may be applied as a texture to the GL surface. In a decision step 770, a decision may be made as to whether all sequential rotation steps been carried out. If all sequential rotation steps have not been carried out, method 730 may continue on to step 775. In step 775, the next inspection image may be selected from the inspection video. In some embodiments, this next inspection image may be the current inspection image in time/space in the inspection video. In other embodiments, the next inspection image may be any other sequential inspection image in time/space in the inspection video. Subsequent to step 775, the method 730 may repeat back at step 755. Referring back to step 770, if all sequential rotation steps have been carried out, method 730 may continue on to step 780. In step 780 the computer animation transition including the rotation correction may be output to one or more non-transitory memories and/or one or more electronic display devices for displaying the computer animation transition in real-time, near real-time, or in playback.

Figure 8:
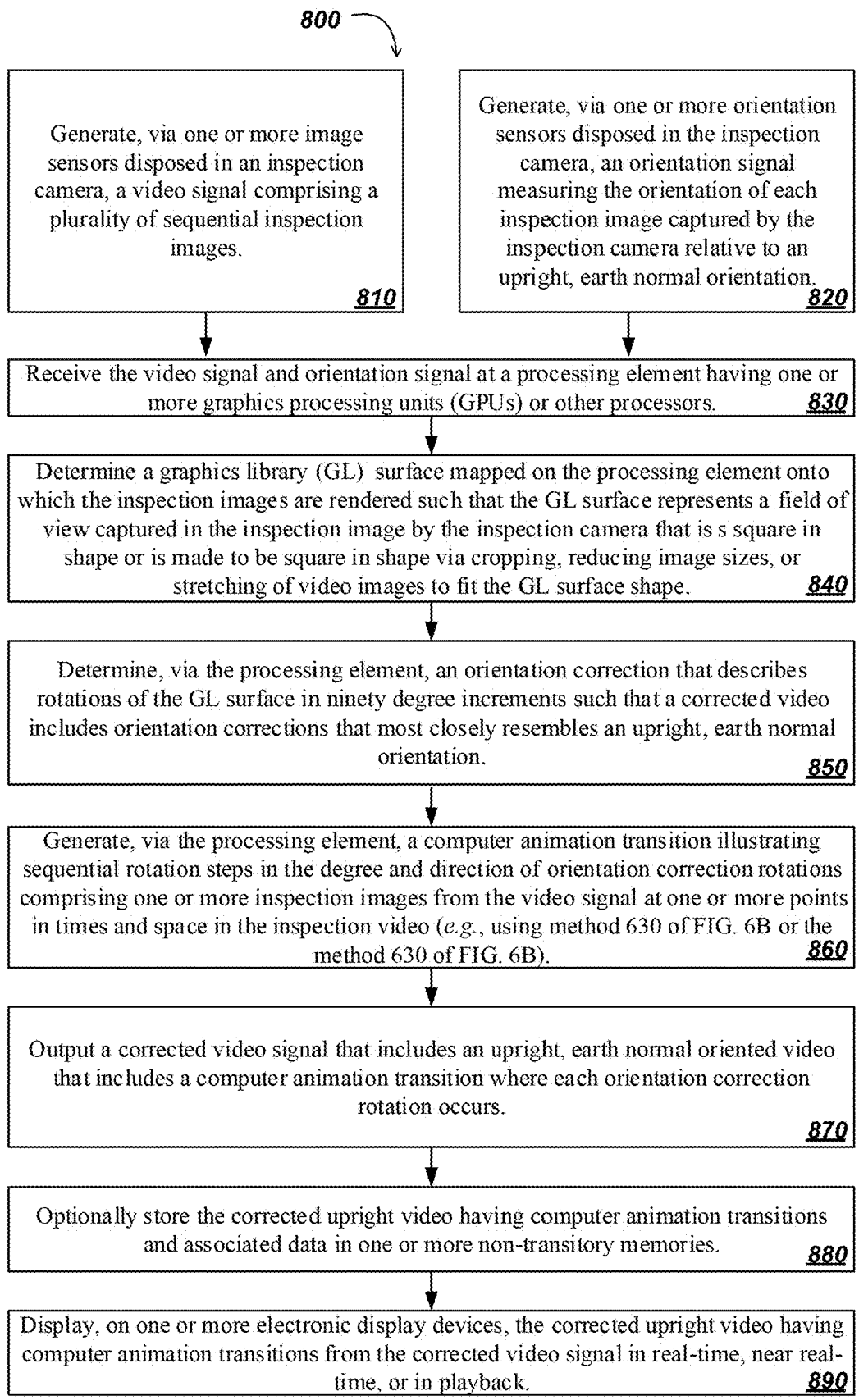
FIG. 8 is an embodiment of a method for leveling of an inspection video that includes computer animation transitions.

Turning to FIG. 8, a method 800 is disclosed for leveling of an inspection video that includes computer animation transitions of the present disclosure. In step 810, the method 800 may include generating, via one or more image sensors disposed in an inspection camera, a video signal comprising a plurality of sequential inspection images. In parallel step 820, the method 800 includes generating, via one or more orientation sensors disposed in the inspection camera, an orientation signal measuring the orientation of each inspection images captured by the inspection camera relative to an upright, earth normal orientation. In step 830 subsequent to steps 810 and 820, the method 800 include receiving the video signal and orientation signal at a processing element having one or more processors which may include one or more graphical processing units (GPUs). In step 840, the method 800 may include determining a GL surface that is square in shape mapped onto the processing element (e.g., one or more GPUs or the like) onto which the video signal images are rendered such that the GL surface represents a field of view captured in the video signal from the inspection camera that is square in shape or is made to be a square in shape via cropping, reducing video image sizes, or stretching of video images to fit the GL surface shape. For instance, in some method embodiments, inspection video images may be applied to the square GL surface as a texture. In step 850, the method 800 may further include determining, via the processing element, an orientation correction that describes rotations of the inspection image captured in the GL surface in ninety degree increments about a centroid such that a corrected video includes orientation corrections that most closely resembles an upright, earth normal orientation (e.g., via the video leveling approach disclosed with FIGS. 5A and 5B). In step 860, the method 800 may further include generating a computer animation transition illustrating sequential rotation steps in the degree and direction of orientation correction rotations. Such a computer animation transition may include one or more inspection images from the video signal at one or more points in times and space in the inspection video rotating from a first orientation of the field of view that may not best align with the upright, earth normal orientation to the field of view orientation best aligning with the upright, earth normal orientation in one or more sequential rotation steps. In step 870, the method 800 may further include outputting a corrected video signal that includes an upright, earth normal oriented video that includes one or more computer animation transitions where orientation correction rotations occur. In step 880, the corrected upright video having computer animation transitions and associated data may optionally be stored in one or more non-transitory memories (e.g. the memory element 174 of FIG. 1B). In step 890, the method 800 may further include displaying, on one or more electronic display devices, the corrected upright video having computer animation transitions from the corrected video signal. For instance, the corrected upright video having computer animation transitions from the corrected video signal may be displayed on the CCU 162 illustrated in FIGS. 1A and 1B, smart phone 164 illustrated in FIGS. 1A and 1B, remote computing device 166 illustrated in FIGS. 1A and 1B, and/or other display device not illustrated.

In some embodiments in keeping with the present disclosure, the GL surface may be any three-dimensional shape including but not limited to a three-dimensional pipe shape. For instance, an inspection video may be applied as a texture to a three-dimensional pipe shaped GL surface (e.g., cylindrical shape or the like) thus the output corrected video signal may be accessible for viewing on various different electronic display devices having a shared graphics library without relying upon a field-programmable gate array (FPGA) or like circuit dedicated for rotations based on specific applications and associated hardware as known in the art. In some such embodiments, orientation corrections may occur along a square cross-section or, where there may be a different polygonal cross-section, increments equal to the central angle measurement of the cross-section polygonal shape about a centroid thereof.

Figure 9A:
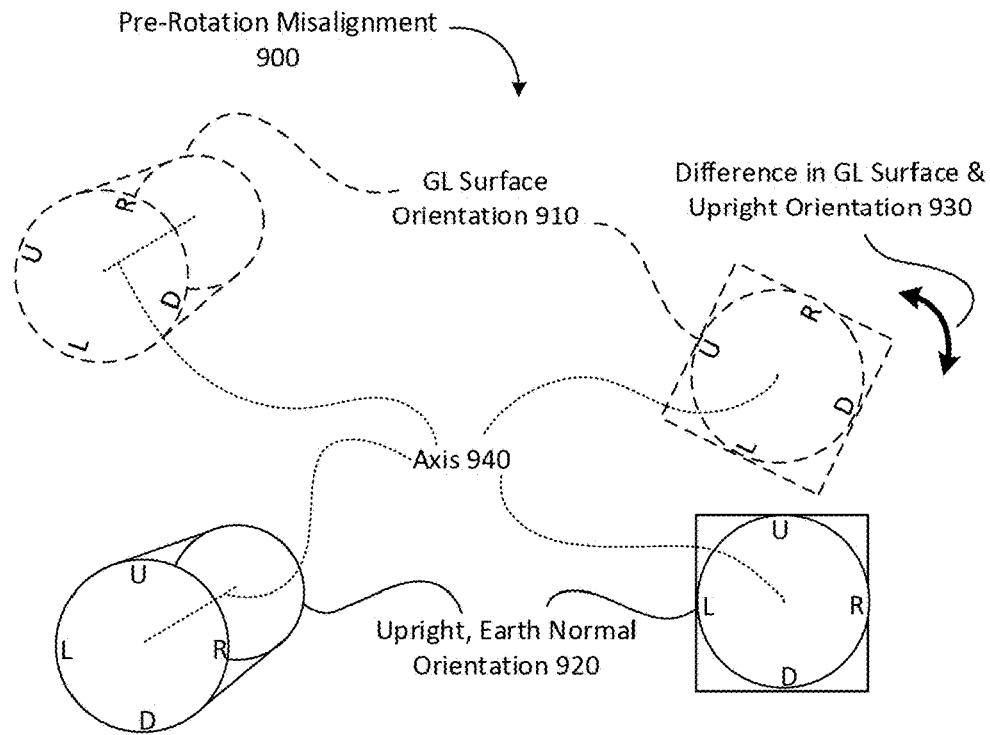
FIG. 9A is an illustration of an embodiment of misalignment between a pre-rotation GL surface that is a three dimensional shape matching the cylindrical shape of the inspected pipe as compared to the upright, earth normal orientation.

Turning to FIG. 9A, a pre-rotation misalignment 900 is illustrated between a GL surface orientation 910 that is a three dimensional shape matching the cylindrical shape of an inspected pipe that is capturing the field of view of the inspection video generated by an inspection camera (e.g., the inspection camera 110 of FIGS. 1A and 1B) and an upright, earth normal orientation 920. As shown, in some applications a difference between the GL surface and the upright orientation 930 may exist. Where the difference between the GL surface and the upright orientation 930 is beyond a predetermined threshold a rotation of the GL surface orientation 910 capturing the field of view of the camera may occur in ninety degree increments about an axis 940 of the cylindrical pipe shape to best align the GL surface orientation 910 to the upright, earth normal orientation 920 to the extent possible. It should be noted that in other embodiments, rotations may occur at increments equal to the central angle measurement of a polygonal cross-sectional plane (e.g., rotations at increments equal to a central angle 1035 illustrated in FIGS. 10A and 10B). Such rotations of a GL surface may occur in either clockwise or counterclockwise directions.

Figure 9B:
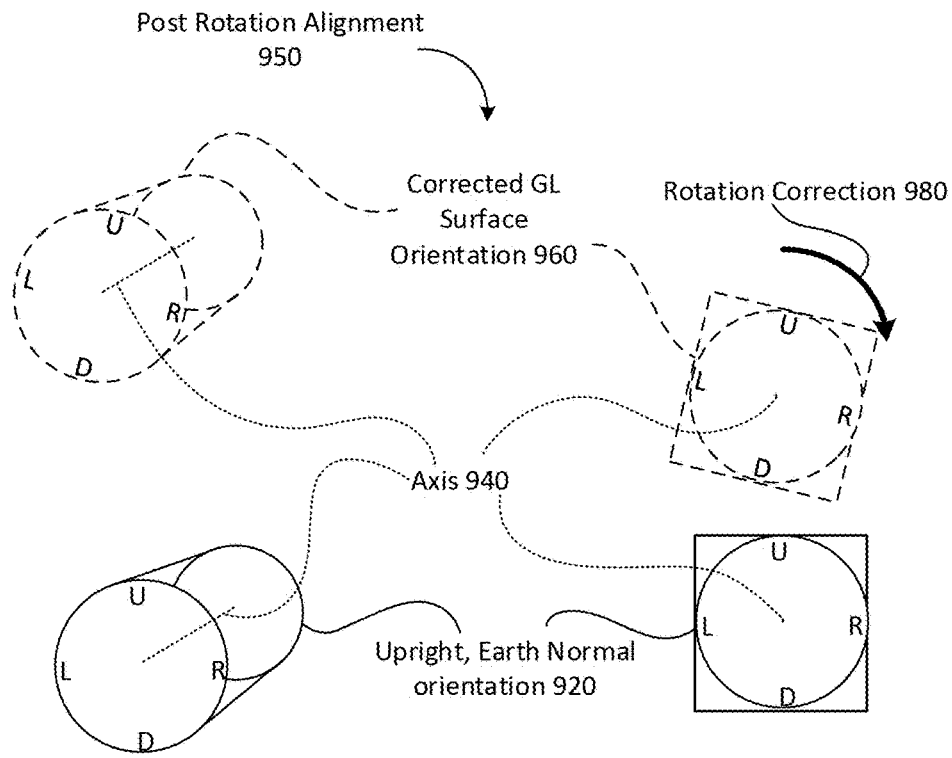
FIG. 9B is an illustration of an embodiment of the post-rotation alignment between the GL surface from FIG. 9A and the upright, earth normal orientation.

Turning to FIG. 9B, a post rotation alignment 950 between a corrected GL surface orientation 960, having experienced one or more rotations in central angle measurement increments 980, and the upright, earth normal orientation 920 is illustrated. As shown, the corrected GL surface orientation 960 and the upright, earth normal orientation 920 may align to a much greater degree versus the pre-rotation misalignment 900 illustrated in FIG. 9A. It should be noted that though the corrected GL surface orientation 960 and the upright, earth normal orientation 920 may align to a much greater degree in the post rotation alignment 950 of FIG. 9B, the alignment may not be exact. Instead, the GL surface represented in the GL surface orientation 910 being rotated at ninety degree increments (or increments equal to the central angle measurement of that particular polygon in embodiments having a polygonal plane cross-section) is a low cost and robust approach to achieve a degree of leveling that would be useful to an observer of an inspection video that is less taxing on processors. In using such an approach to leveling video, an observer may be provided a computer animated transition where such video leveling events occur in a corrected inspection video that is generated in real-time, near real-time, or generated in post processing.

In some embodiments in keeping with the present disclosure, the GL surface may be any regular polygon shape. For instance, an inspection video may be applied as a texture to a polygonal GL surface (e.g., pentagon, hexagon, heptagon, and through to an nth sided polygon) thus the output corrected video signal may be accessible for viewing on various different electronic display devices having a shared graphics library without relying upon a field-programmable gate array (FPGA) or like circuit dedicated for rotations based on specific applications and associated hardware as known in the art. In some such embodiments, orientation corrections may occur at increments equal to the central angle measurement of the polygonal shape about a centroid thereof.

Figure 10A:
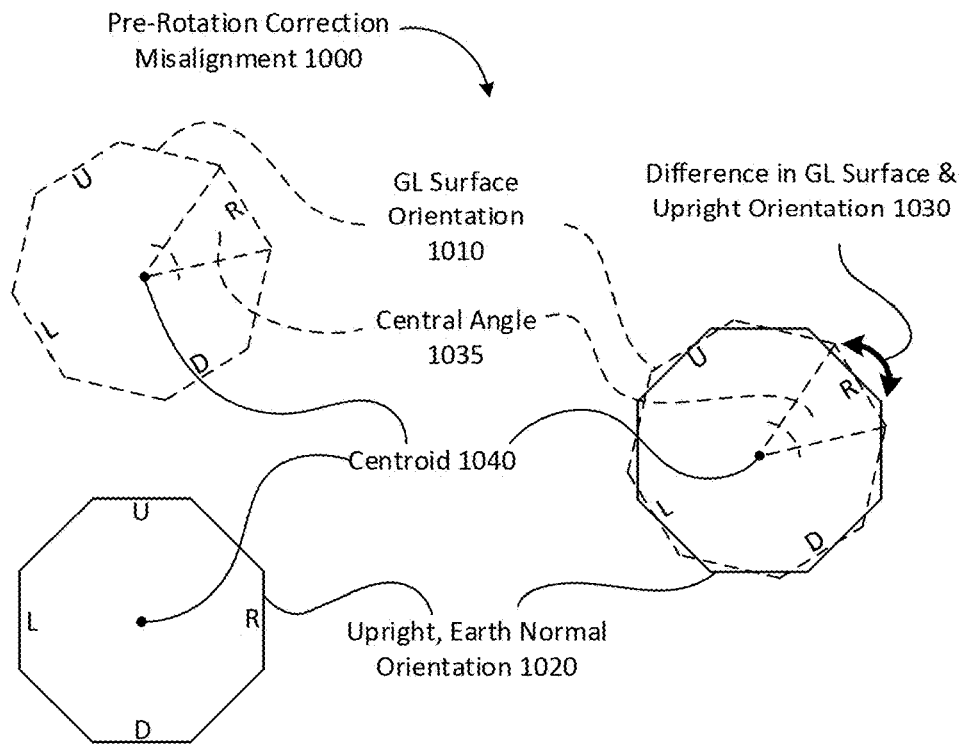
FIG. 10A is an illustration of an embodiment of misalignment between a pre-rotation GL surface that is a regular polygon shape as compared to the upright, earth normal orientation.

Turning to FIG. 10A, a pre-rotation misalignment 1000 is illustrated between a polygonal shaped GL surface orientation 1010 that is capturing the field of view of the inspection video generated by an inspection camera (e.g., the inspection camera 110 of FIGS. 1A and 1B) and an upright, earth normal orientation 1020 (illustrated as a octagon but may be any regular polygon). As shown, in some applications a difference between the GL surface and the upright orientation 1030 may exist. Where the difference between the GL surface and the upright orientation 1030 is beyond a predetermined threshold a rotation of the GL surface from the GL surface orientation 1010 may occur in increments equal to the central angle measurement (e.g., a central angle 1035) about a centroid 1040 to best align the GL surface orientation 1010 to the upright, earth normal orientation 1020. Such rotations of a GL surface may occur in either clockwise or counterclockwise directions and may occur in any increment multiple of the measure of the polygons central angle (e.g., the central angle 1035).

Figure 10B:
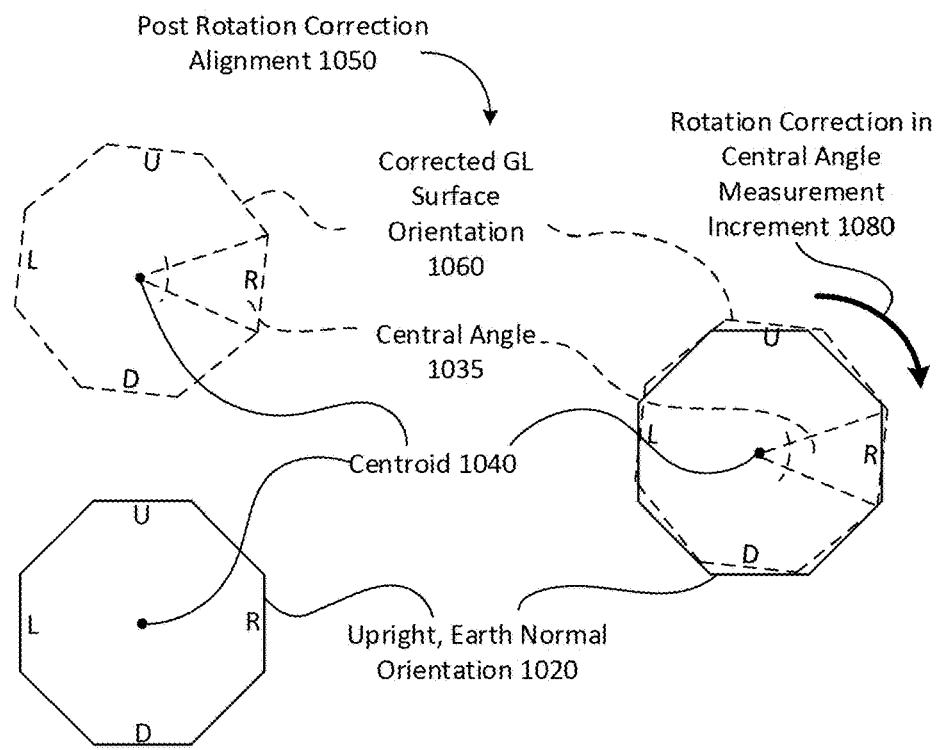
FIG. 10B is an illustration of an embodiment of the post-rotation alignment between the GL surface from FIG. 10A and the upright, earth normal orientation.

Turning to FIG. 10B, a post rotation alignment 1050 between a corrected GL surface orientation 1060, having experienced one or more rotations in central angle measurement increments 1080, and the upright, earth normal orientation 1020 is illustrated. As shown, the corrected GL surface 1060 orientation and the upright, earth normal orientation 1020 may align to a much greater degree versus the pre-rotation misalignment 1000 illustrated in FIG. 10A. It should be noted that though the corrected GL surface 1060 orientation and the upright, earth normal orientation 1020 may align to a much greater degree in the post rotation alignment 1050 of FIG. the alignment may not be exact. Instead, the GL surface orientation 1010 being rotated at increments equal to the central angle measurement of that particular polygon represents a low cost and robust approach to achieve a degree of leveling that would be useful to an observer of an inspection video that is less taxing on processors. In using such an approach to leveling video, an observer may be provided a computer animated transition where such video leveling events occur in a corrected inspection video that is generated in real-time, near real-time, or generated in post processing.

Figure 11:
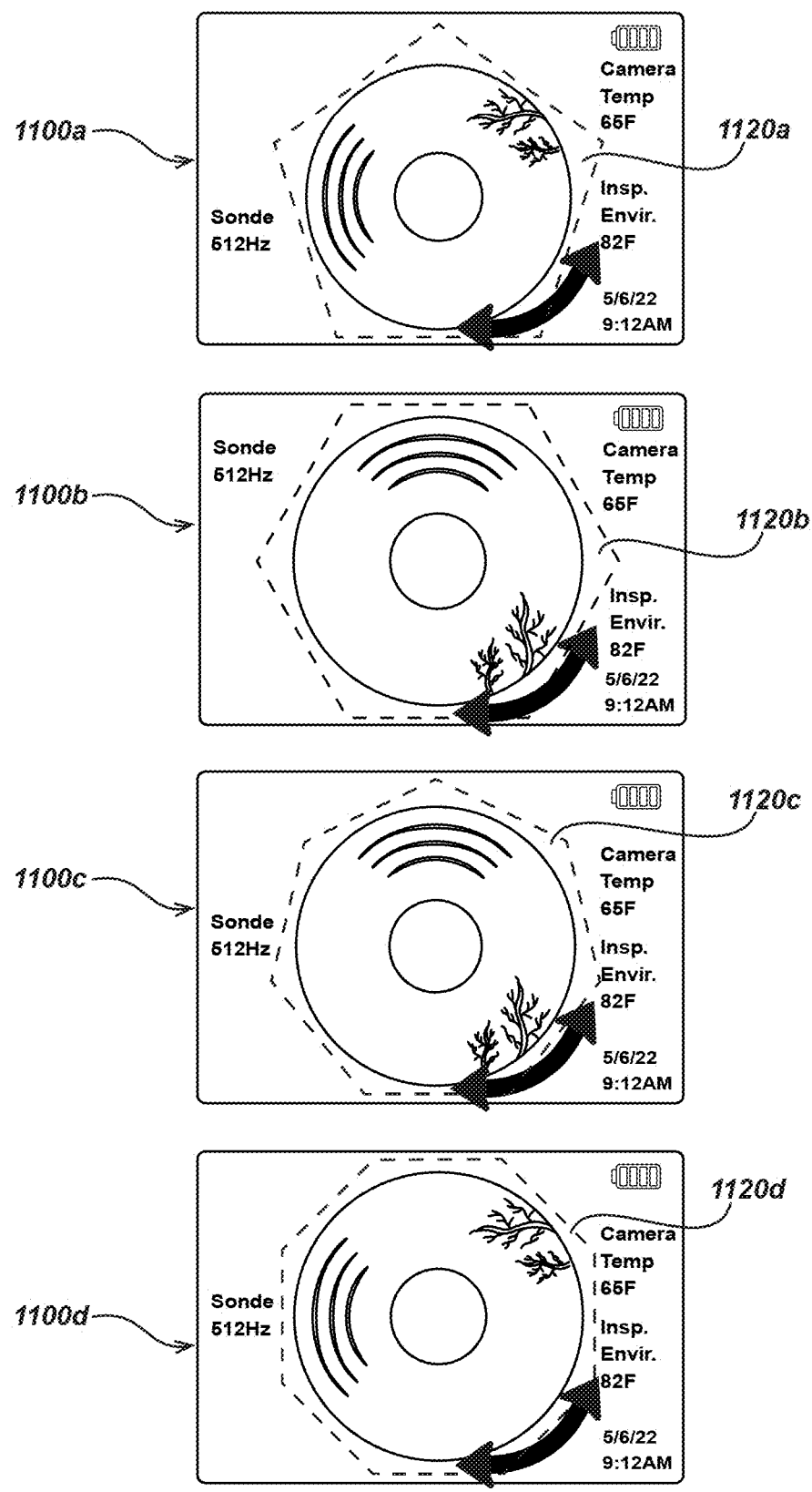
FIG. 11 is an illustration of of an embodiment of various regular polygonal shapes of GL surfaces.

Turning to FIG. 11, a number of different display interfaces 1100a, 1100b, 1100c, and 1100d are illustrated 1100 is illustrated demonstrating different polygonal shaped GL surfaces 1120a, 1120b, 1120c, and 1120d. As illustrated the GL surfaces 1120a is a pentagonal shaped GL surface, the GL surfaces 1120b is a hexagonal shaped GL surface, the GL surfaces 1120c is a heptagonal shaped GL surface, and the GL surfaces 1120d is an octagonal shaped GL surface. It should be noted that a GL surface may be shaped via any regular polygon shape (through to an nth sided polygon).

Turning to FIG. 12, a method 1200 is disclosed for employing computer animation transitions as used in inspection systems of the present disclosure. In step 1210 the method 1200 may include generating, via one or more image sensors disposed in an inspection camera, a video signal comprising a plurality of sequential inspection images. In a parallel step 1220 the method 1200 may include generating, via one or more orientation sensors disposed in the inspection camera, an orientation signal measuring the orientation of the field of view captured by the inspection camera relative to an upright, earth normal orientation. In step 1230 subsequent to steps 1210 and 1220, the method 1200 may include receiving the video signal and orientation signal at a processing element having one or more processors which may include one or more graphical processing units (GPUs) and/or other processors. In step 1240 the method 1200 may include determining a graphics library (GL) surface mapped on the processing element onto which the video signal images are rendered such that the GL surface represents a field of view captured in the video signal from the inspection camera that is a regular polygonal in shape or is made to be a regular polygon in shape via cropping, reducing image sizes, or stretching of video images to fit the GL surface shape. For instance, in some method embodiments, inspection video images may be applied to the polygonal GL surface as a texture. The step 1240 may utilize the computer animation transition method 630 of FIG. 6B or the computer animation transition method 730 of FIG. 7B that includes rotation correction. In step 1250 the method 1200 may further include determining, via the processing element, an orientation correction that describes rotations of the GL surface in increments equal to the measure of the central angle such that a corrected video includes orientation corrections that most closely resembles the field of view having an upright, earth normal orientation. In step 1260 the method 1200 may further include generating a computer animation transition illustrating sequential rotation steps in the degree and direction of orientation correction rotations comprising one or more inspection images from the video signal at one or more points in times and space in the inspection video (e.g., using method 630 of FIG. 6B or the method 730 of FIG. 7B). In step 1270, the method 1200 may further include outputting a corrected video signal that includes an upright, earth normal oriented video along the most upright ninety degree rotation increment and further includes one or more computer animation transitions where orientation correction rotations occur. In step 1280, the corrected upright video having computer animation transitions and associated data may optionally be stored in one or more non-transitory memories (e.g. the memory element 174 of FIG. 1B). In step 1290, the method 1200 may further include displaying, on one or more electronic display devices, the corrected upright video having computer animation transitions from the corrected video signal. For instance, the corrected upright video having computer animation transitions from the corrected video signal may be displayed on the CCU 162 illustrated in FIGS. 1A and 1B, smart phone 164 illustrated in FIGS. 1A and 1B, remote computing device 166 illustrated in FIGS. 1A and 1B, and/or other display device not illustrated.

Figure 13:
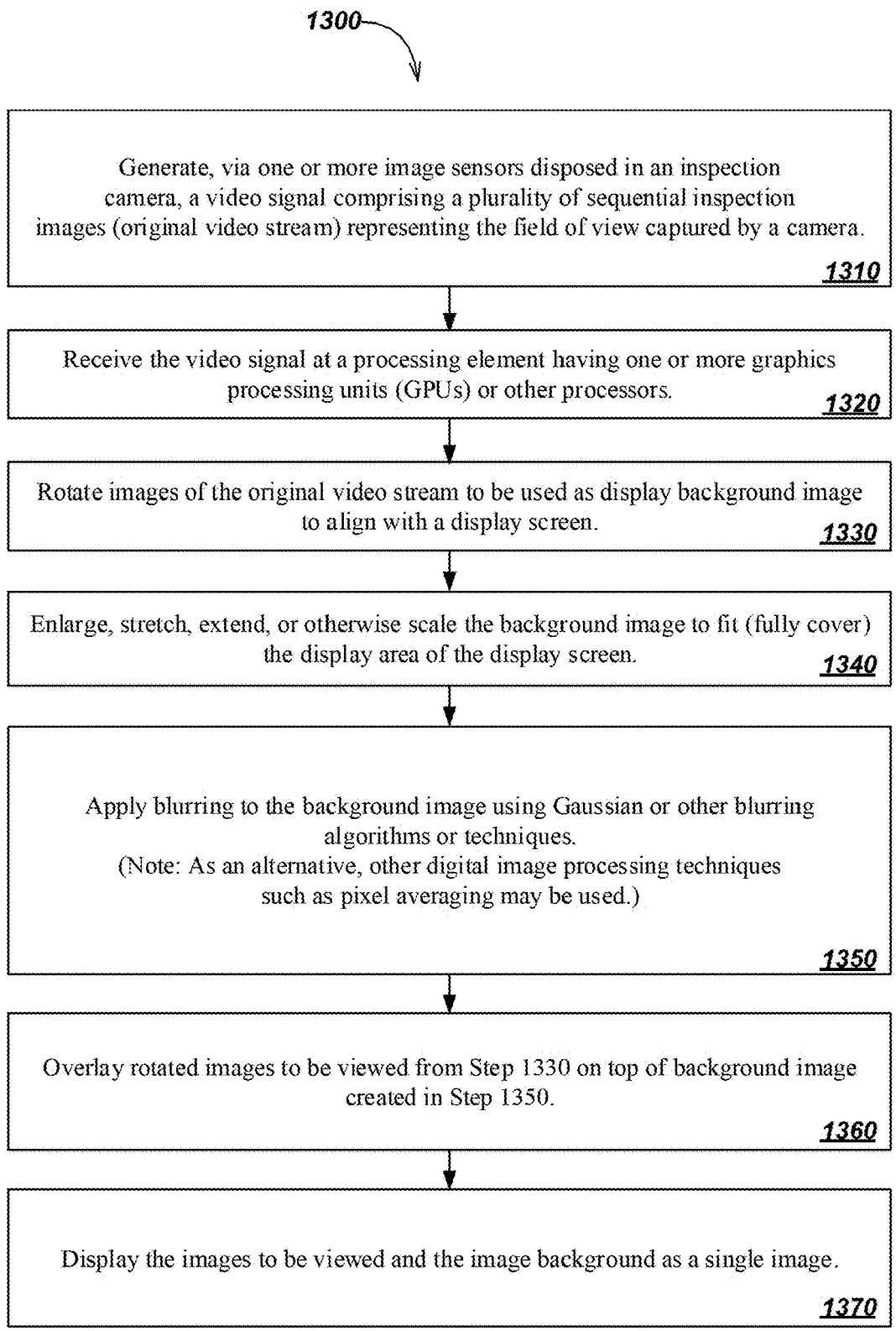
FIG. 13 is an embodiment of a method for editing an image to smooth the transition between the edges of the actual image, and regions of a display that are filled with background using a blurring algorithm or other technique.

FIG. 13 illustrates details of an exemplary embodiment 1300 of a method for editing an image to smooth the transition between the edges of an actual image and regions of a display that are filled with background using image editing filters, algorithms, and techniques such as blurring, pixel averaging, etc. The method starts by generating images (original video stream) 1310 which may captured from a camera, photosensor(s), or other image capturing devices, and then receiving the video signal at a processing element 1320. Next, various image/photo editing techniques are applied. Background image(s) to be displayed are rotated to align with a display screen 1330. The image(s) selected to be used as a background may be a single image or multiple images, and may be still images or a video stream. Next, the background image is edited to fit (fully cover) the display area of the display screen in step 1340 by enlarging, stretching, extending or otherwise scaling the images. Scaling may be proportional (i.e. keeping the original image proportions) or nonproportional. In step 1350 the background image is blurred using a Gaussian Filter or other blurring filters, algorithms, or techniques. As an alternative to blurring pixel averaging may be used. In step 1360 the rotated images to be viewed from step 1330 or overlaid over the background image created in step 1350, and then the images are rendered as a single image on a display screen 1370. As an alternative to rendering as a single image, images may be composed of discrete layers, and rendered to look like a single image.

Figure 14:
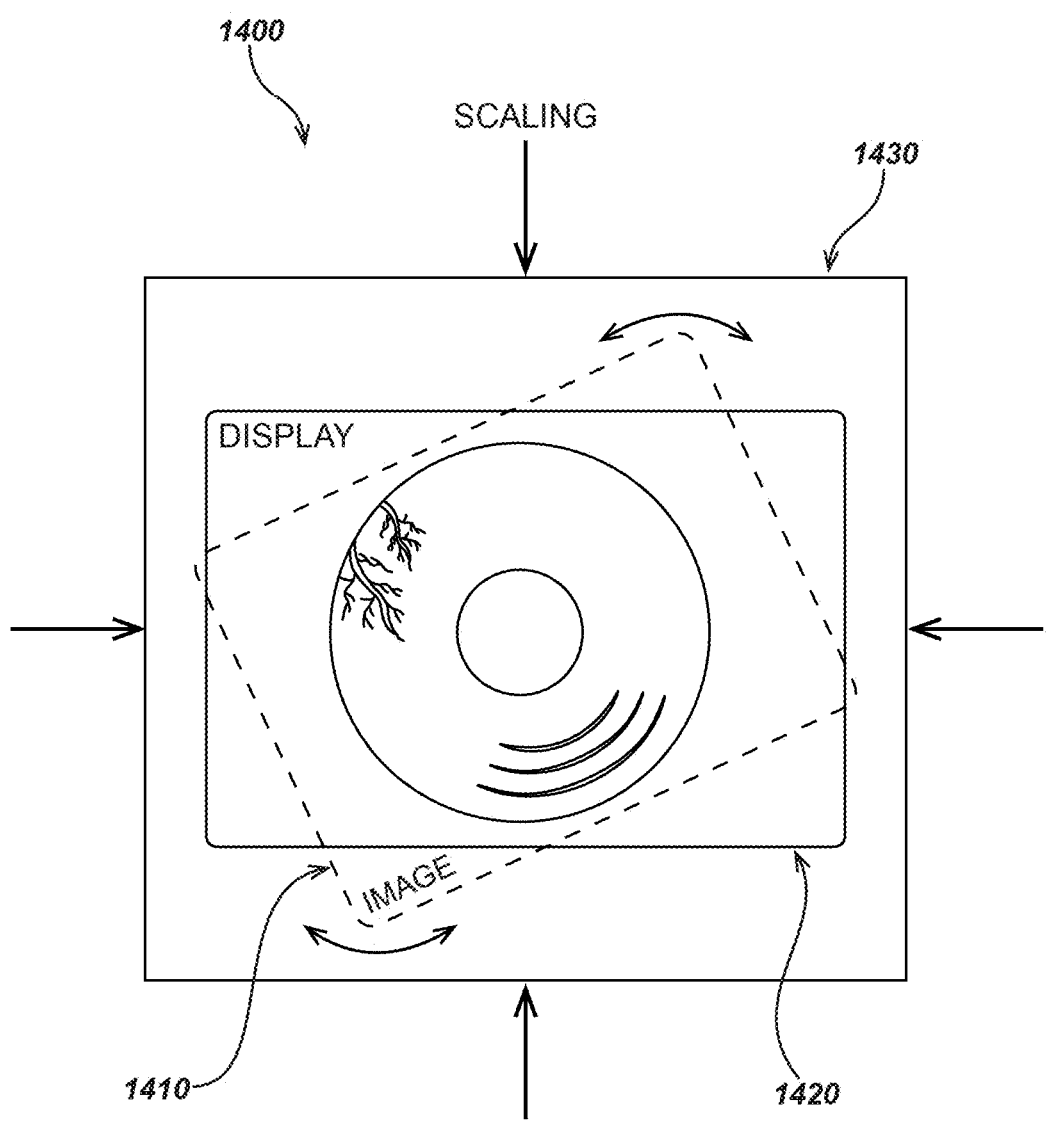
FIG. 14 is an illustration of an embodiment of rotating and scaling an image to be displayed.

FIG. 14 illustrates details of an exemplary embodiment 1400 of an illustration of rotating and scaling an image to be displayed. An image 1410 is rotated as necessary to line up the image 1410 with a display 1420 in a desired position. Then, the image 1410 is scaled by resizing both the horizontal and vertical sides of the image frame 1430 to fit the display. A chosen background image or video stream, as well as an actual image to be overlaid and displayed on the background image, may both be fitted to the display screen in a likewise manner. Note that the sequence of image editing steps to fit the display screen, e.g. rotating, scaling, etc., may be done in any order, or simultaneously.

Figure 15:
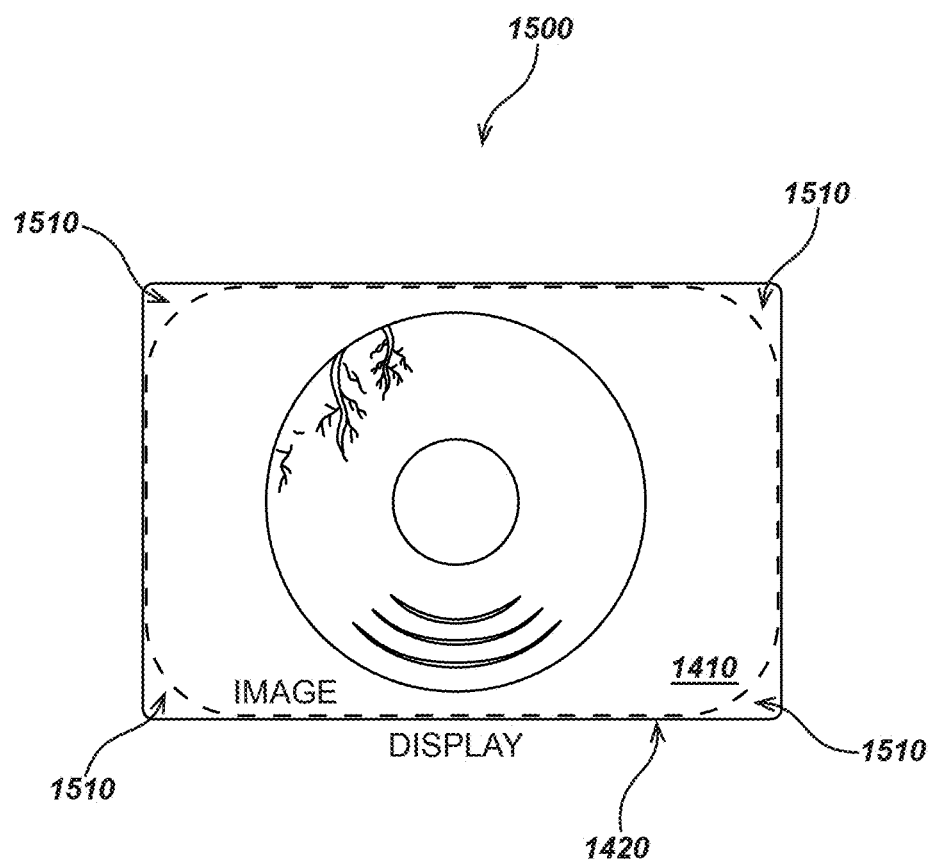
FIG. 15 is an illustration of an embodiment of an image being displayed that does not completely cover the display area.

FIG. 15 illustrates details of an exemplary embodiment 1500 of an illustration of an image being displayed that does not completely cover the display area. Image 1410 is shown aligned and scaled to fit display screen 1420. However, uncovered/unfilled non-image background areas or regions 1510 of display screen 1420 may remain due to different aspect ratios between the camera that captured image 1410, and the display screen 1420. Different images to be displayed 1410 may have uncovered/unfilled areas or regions 1510 located in different sizes, shapes, and locations than shown.

Figure 16:
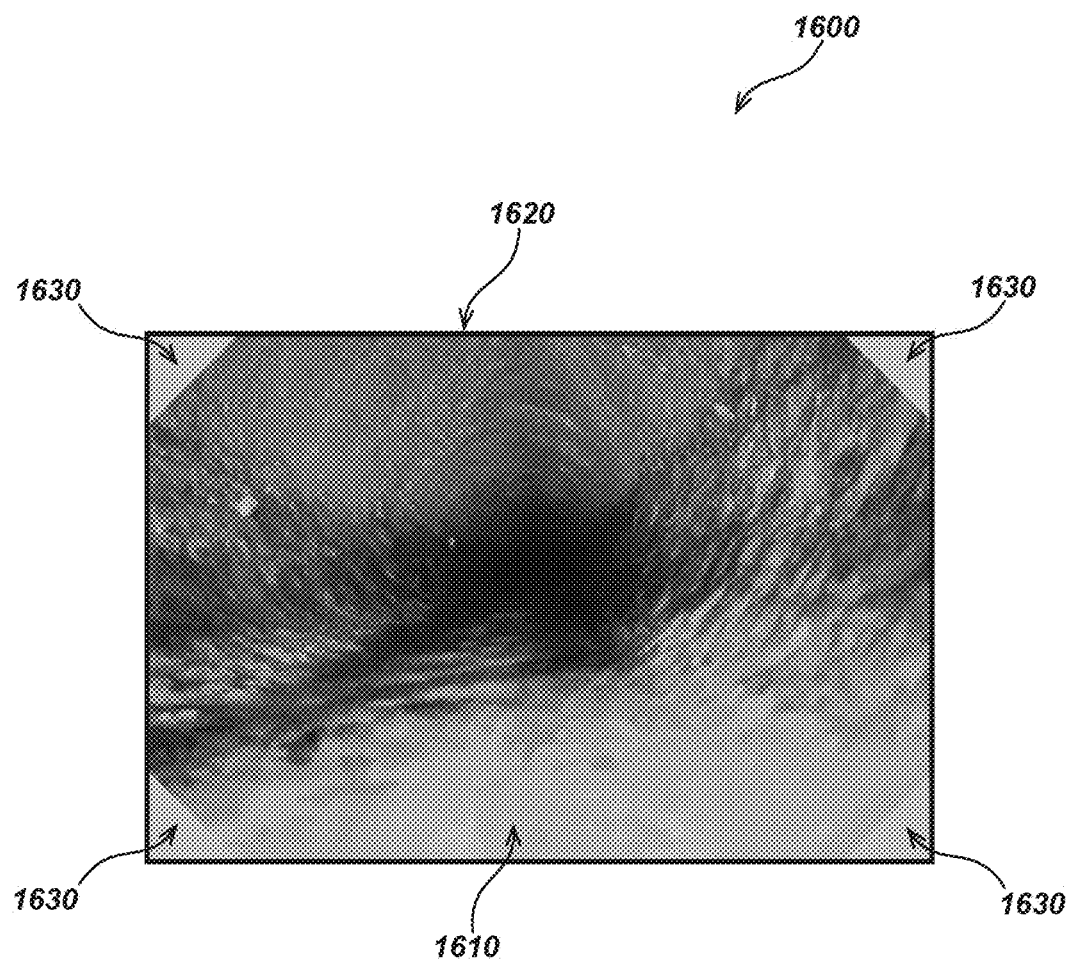
FIG. 16 is an illustration of an embodiment of an image before it is edited using a blurring algorithm or technique.

FIG. 16 illustrates details of an exemplary embodiment 1600 of an illustration of an image 1610 before it has been edited overlaying the image 1610 on another similar image, and then applying a blurring algorithm or technique. An actual image to be displayed 1610 is shown on a display screen 1620 with uncovered/unfilled non-image background areas or regions 1630.

Figure 17:
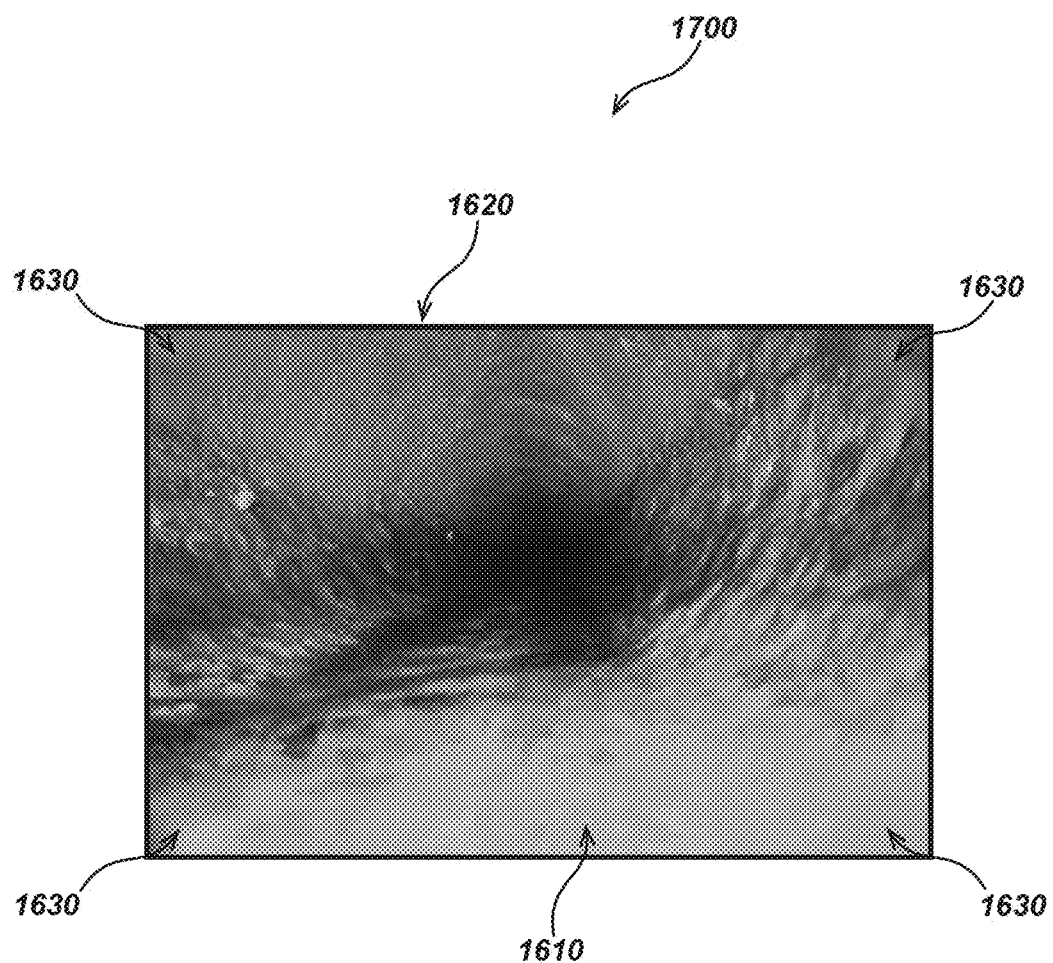
FIG. 17 is an illustration of an embodiment of an image after it is edited using a blurring algorithm or technique.

FIG. 17 illustrates details of an exemplary embodiment 1700 of an illustration of an image 1610 after it has been edited by applying a Gaussian Filter to provide a blurring effect. An actual image to be displayed 1610 is shown on a display screen 1620 with previously uncovered/unfilled non-image background areas or regions 1630 have now been blurred to provide a more appealing, natural view by smoothing out the transition between the actual image 1610 and the non-image background 1630.

Figure 18:
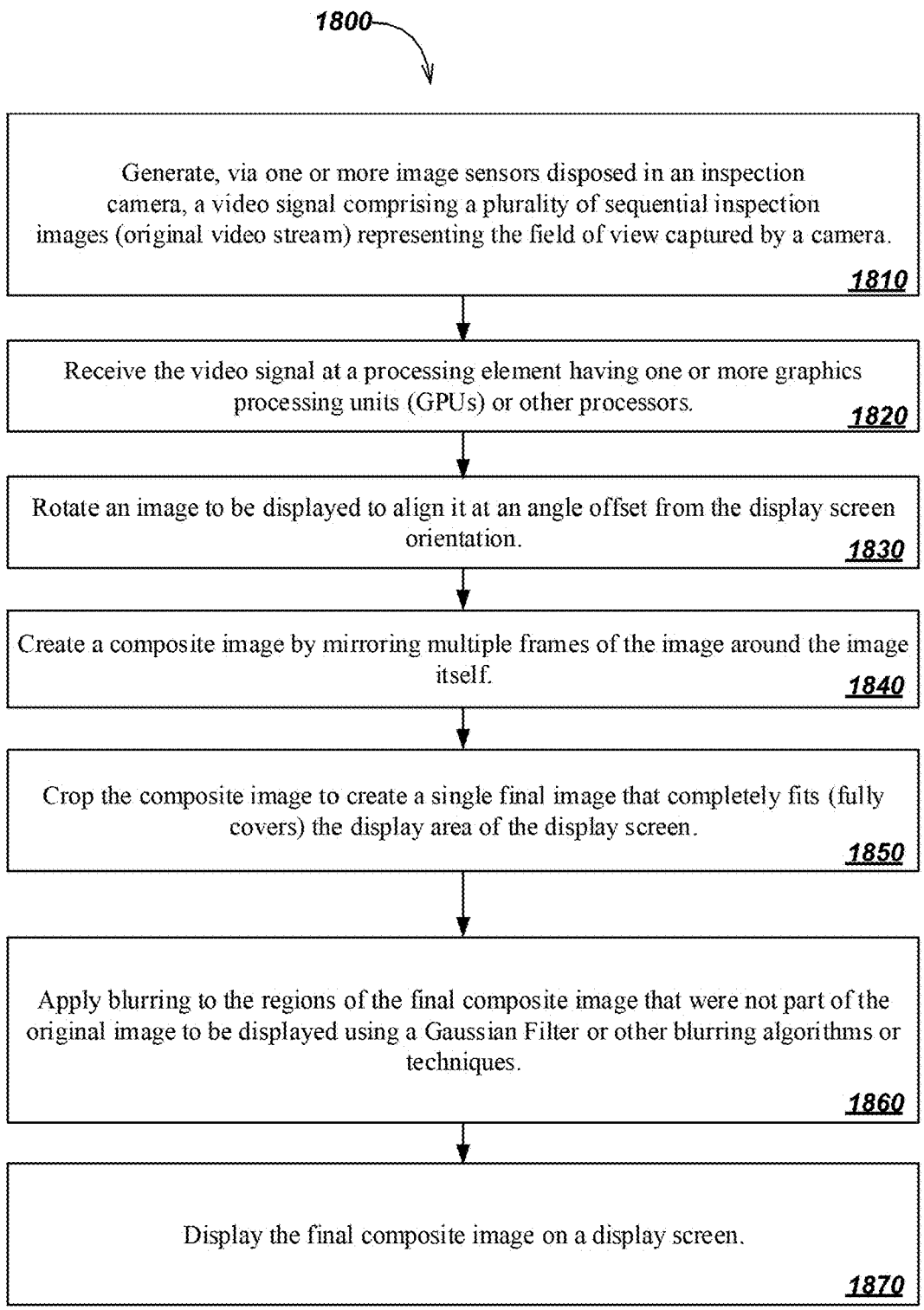
FIG. 18 is an embodiment of a method for editing an image created by mirroring a frame around itself to create a single composite image with smoother edge transitions by aligning the images of the created multiple frames.

FIG. 18 illustrates details of an exemplary embodiment 1800 of a method for minoring a frame around itself to create a single composite image with smoother edge transitions by aligning the images of the created multiple frames. The method begins by generating, via one or more image sensors disposed in an inspection camera, a video signal comprising a plurality of sequential inspection images (original video stream) representing the field of view captured by a camera 1810. Next, the video signal is received at a processing element having one or more graphics processing units (GPUs) or other processors 1820. In block 1830 an image to be displayed is rotated to align it at angle offset from the display screen orientation. Next, a composite image is created by mirroring multiple frames of the image around the image itself 1840. The composite image from step 1840 is then cropped to create a single final image that completely fits (fully covers) the area of the display screen 1850. In step 1860 blurring is applied to regions of the final composite image that were not part of the image to be displayed. Lastly, the final composite image is rendered on a display screen 1870.

Figure 19:
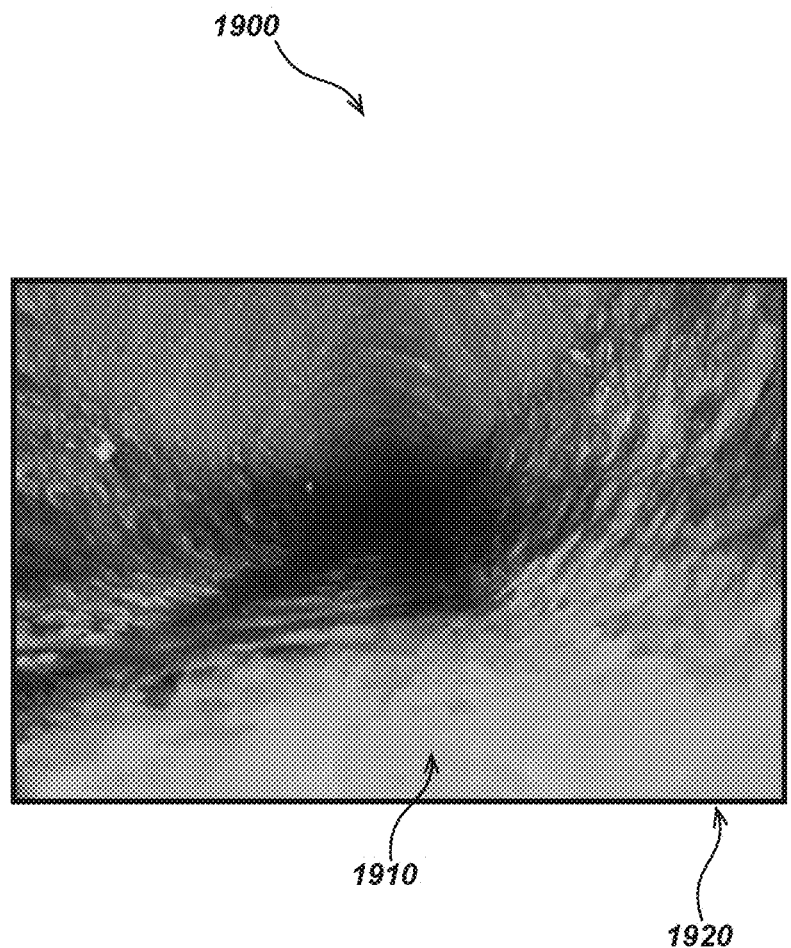
FIG. 19 is an illustration of an embodiment of a composite image created by mirroring a single image around itself.

FIG. 19 illustrates details of an exemplary embodiment 1900 of an embodiment of a composite image 1910 created by minoring the single image 1910 around itself, and then cropping the mirrored image so that only the composite image 1910 is rendered on display screen 1920. As an alternative to using a single image 1910, each image may actually be a separate GL surface.

Figure 20:
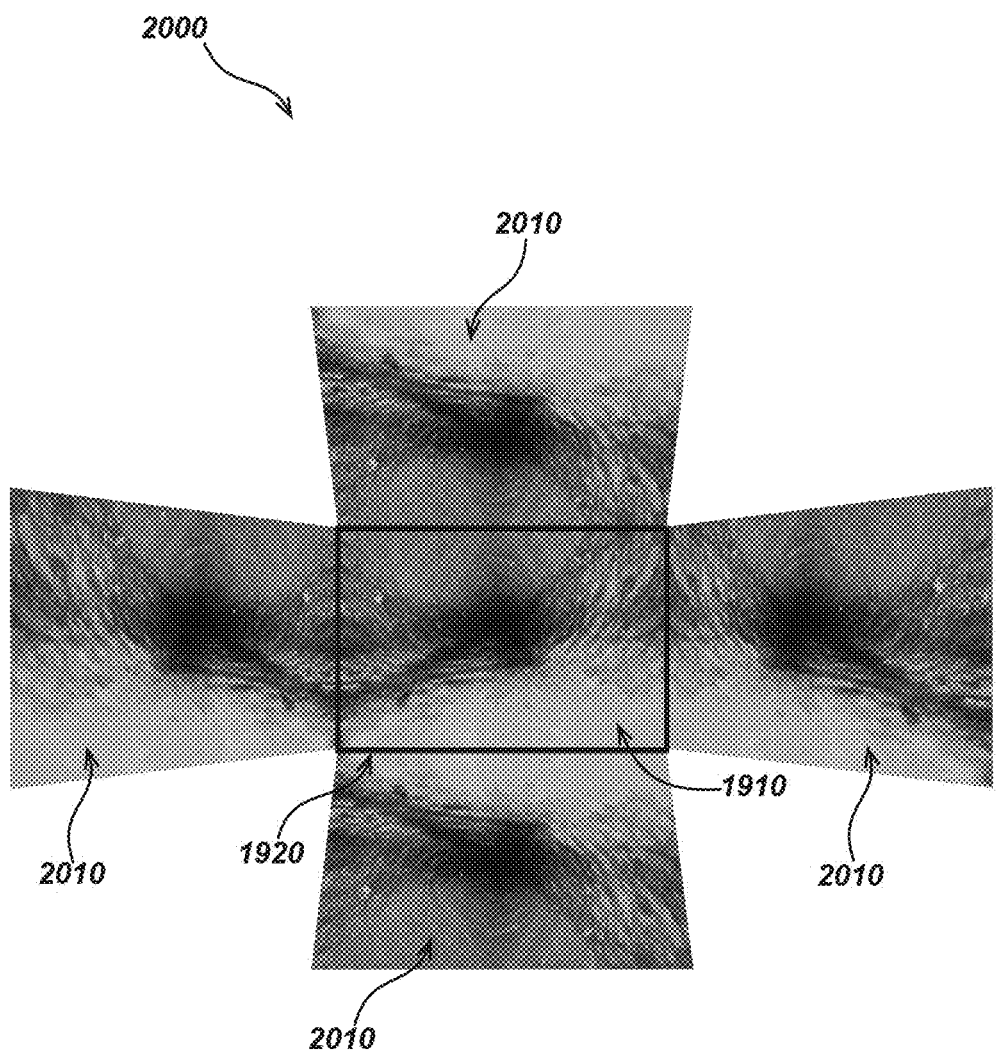
FIG. 20 is an illustration of an embodiment of a display view with image sensation of motion and depth in a pipe, void, or conduit.

FIG. 20 illustrates details of an exemplary embodiment 2000 of a variation of FIG. 19 in which the mirrored images are projected by any of various means in the art, so that they appear at an angle to the main display image that is consistent with looking directly into a section of pipe. This may give the sensation of motion and depth in the pipe, and ameliorate any disorienting visual-perceptive qualities of digital image rotation. A composite image is created 1910 created by mirroring a single image 1910 around itself 2010. Then, blurring effects are applied to the regions of the mirrored images 2010 that overlap with the composite image 1910. Bending effects are then applied to the composite image 1910 to create an image with a moving forward visual perception view. The final composite image 1910 may then be cropped to fit a display screen 1920.

In some configurations, the apparatus or systems described herein may include means for implementing features or providing functions described herein. In one aspect, the aforementioned means may be a module including a processor or processors, associated memory and/or other electronics in which embodiments of the invention reside, such as to implement image and/or video signal processing, switching, transmission, or other functions to process and/or condition camera outputs, control lighting elements, control camera selection, or provide other electronic or optical functions described herein. These may be, for example, modules or apparatus residing in camera assemblies, camera and lighting assemblies, or other assemblies disposed on or within a push-cable or similar apparatus.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to tools, instruments, and other described devices may be implemented or performed in one or more processing elements using elements such as a general or special purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Processing elements may include hardware and/or software/firmware to implement the functions described herein in various combinations.

The previous description of the disclosed embodiments is provided to enable any person skilled in the art to make or use various embodiments. Various modifications to these embodiments will be readily apparent to those skilled in the art, and the generic principles defined herein may be applied to other embodiments without departing from the spirit or scope of the disclosure.

Accordingly, the presently claimed invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the scope of the present disclosure is not intended to be limited to only the specific aspects shown herein but should be accorded the widest scope consistent with the embodiments herein and their equivalents.

We claim:

1. A method for video leveling that includes computer animation transitions for use in pipe inspection systems, comprising:
    generating, via one or more image sensors disposed in an inspection camera, a video signal comprising a plurality of sequential inspection images representing the field of view captured by the camera and, via one or more orientation sensors disposed in the inspection camera, an orientation signal measuring the orientation of the inspection images relative to an upright, earth normal orientation in inspection images of the video signal;
    receiving the video signal and orientation signal at a processing element having one or more graphics processing units (GPUs) or other processors;
    determining an orientation correction for the video signal describing rotations of the inspection images in ninety degree increments that reorients the images to most closely resemble an upright, earth normal orientation;
    generating a computer animation transition illustrating sequential steps in the degree and direction of orientation correction rotations comprising one or more inspection images from the video signal at one or more points in times and space in the inspection video;
    outputting a corrected video signal that includes an upright, earth normal oriented video along the most upright ninety degree rotation increment that further includes one or more computer animation transitions where orientation correction rotations occur; and
    displaying, on a display interface on one or more electronic display devices, the corrected upright video having computer animation transitions from the corrected video signal.

2. The method of claim 1, wherein the inspection images captured in the video signal are cropped, reduced in size, or stretched to fit the inspection area represented on the display interface in the rotation correction.

3. The method of claim 1, wherein the computer animation transition includes cropping, reducing in size, or stretching to fit the inspection area represented on the display interface at each rotation step.

4. The method of claim 1, wherein the inspection video images are mapped onto a graphics library (GL) surface that is further rotated in rotation corrections and associated computer animation transitions.

5. The method of claim 1, wherein orientation corrections are generated from a single inspection image from the video signal captured at a single point in time and space in the inspection video.

6. The method of claim 1, wherein orientation corrections are generated from a plurality of inspection images from the video signal captured at successive points in time and space.

7. The method of claim 1, wherein the method is carried out and displayed in real-time or near real-time.

8. The method of claim 1, wherein the corrected upright video having computer animation transitions is stored in one or more non-transitory memories.

9. The method of claim 8, wherein the method is carried out in post-processing in one or more electronic display devices.

10. The method of claim 1, wherein the inspection image rotates independently of other non-rotating additional information on a display interface during computer animation transitions for leveling video to upright, earth normal orientation.

11. A method for video leveling that includes computer animation transitions for use in pipe inspection systems, comprising:

generating, via one or more image sensors disposed in an inspection camera, a video signal comprising a plurality of sequential inspection images and, via one or more orientation sensors disposed in the inspection camera, an orientation signal measuring the orientation of the inspection images captured by the inspection camera relative to an upright, earth normal orientation;

receiving the video signal and orientation signal at a processing element having one or more graphics processing units (GPUs) or other processors;

determining a graphics library (GL) surface mapped on the processing element onto which the video signal images are rendered such that the GL surface represents a field of view captured in the video signal from the inspection camera that is or is made to be square in shape;

determining, via the processing element, an orientation correction that describes rotations of the inspection images captured in the GL surface in ninety degree increments such that a corrected video includes orientation corrections that most closely resemble an upright, earth normal orientation;

generating a computer animation transition illustrating sequential rotation steps in the degree and direction of orientation correction rotations comprising one or more inspection images from the video signal at one or more points in times and space in the inspection video;

outputting a corrected video signal that includes an upright, earth normal oriented video along the most upright ninety degree rotation increment that further includes one or more computer animation transitions where orientation correction rotations occur; and displaying, on a display interface on one or more electronic display devices, the corrected upright video having computer animation transitions from the corrected video signal.

12. The method of claim 11, wherein the GL surface is a three dimensional shape matching the cylindrical shape of the inspected pipe and rotation corrections occur about the axis of the cylindrical pipe shape.

13. The method of claim 11, wherein the GL surface is a non-square regular polygon in shape as mapped onto the processing element and rotation corrections occur at increments equal to the central angle of that polygonal shape.

14. The method of claim 11, wherein inspection images are cropped, reduced in size, stretched, or otherwise resized to fit the GL surface shape.

15. The method of claim 11, wherein orientation corrections are generated from a single inspection image from the video signal captured at a single point in time and space in the inspection video.

16. The method of claim 11, wherein orientation corrections are generated from a plurality of inspection images from the video signal captured at successive points in time and space.

17. The method of claim 11, wherein the method is carried out and displayed in real-time or near real-time.

18. The method of claim 11, wherein the corrected upright video having computer animation transitions is stored in one or more non-transitory memories.

19. The method of claim 18, wherein the method is carried out in post-processing in one or more electronic display devices.

20. The method of claim 11, wherein the GL surface rotates independently of other non-rotating additional information on the display interface during computer animation transitions for leveling video to upright, earth normal orientation.

* * * * *